United States Patent
Duan et al.

(10) Patent No.: US 12,300,049 B2
(45) Date of Patent: May 13, 2025

(54) WIRELESS, TAG-BASED MANAGEMENT OF EQUIPMENT- OPERATOR INTERACTIONS

(71) Applicant: Red Point Positioning Corporation, Boston, MA (US)

(72) Inventors: Chunjie Duan, Brookline, MA (US); Serhii Rybalko, Kharkov (UA); Alexey Liushnia, Kharkov (UA); Yaroslav Zhbankov, Kharkov (UA)

(73) Assignee: Red Point Positioning Corporation, Boston, MA (US)

( * ) Notice: Subject to any disclaimer, the term of this patent is extended or adjusted under 35 U.S.C. 154(b) by 143 days.

(21) Appl. No.: 17/462,628

(22) Filed: Aug. 31, 2021

(65) Prior Publication Data

US 2023/0067130 A1    Mar. 2, 2023

(51) Int. Cl.
| | |
|---|---|
| *G07C 9/00* | (2020.01) |
| *H04W 72/04* | (2023.01) |
| *H04W 72/0453* | (2023.01) |

(52) U.S. Cl.
CPC .... *G07C 9/00309* (2013.01); *H04W 72/0453* (2013.01); *G07C 2009/00769* (2013.01)

(58) Field of Classification Search
CPC .......... G07C 9/00309; H04W 72/0453; H04W 72/04; H04W 72/044; H04W 72/0446
USPC ...................................................... 340/5.61
See application file for complete search history.

(56) References Cited

U.S. PATENT DOCUMENTS

| | | | |
|---|---|---|---|
| 9,241,235 B2 | 1/2016 | Santavicca | |
| 11,423,487 B1 * | 8/2022 | Beard | G06Q 10/063112 |
| 2002/0055361 A1 * | 5/2002 | McDonnell | G06F 21/6218 |
| | | | 455/410 |
| 2002/0087345 A1 * | 7/2002 | Bly | G06Q 10/10 |
| | | | 705/50 |
| 2012/0111589 A1 * | 5/2012 | Schmidt | B25F 5/00 |
| | | | 173/1 |
| 2013/0099892 A1 * | 4/2013 | Tucker | H04L 9/08 |
| | | | 340/5.61 |
| 2015/0156746 A1 | 6/2015 | Horne et al. | |
| 2015/0185309 A1 | 7/2015 | Pu et al. | |
| 2015/0311649 A1 | 10/2015 | Horne et al. | |
| 2016/0212579 A1 | 7/2016 | Duan et al. | |

(Continued)

*Primary Examiner* — Yong Hang Jiang
(74) *Attorney, Agent, or Firm* — Guntin & Gust, PLC; Robert Gingher

(57) ABSTRACT

Aspects of the subject disclosure may include, for example, storing an operator certification value at a first mobile device. A first wireless signal is obtained via a first wireless technology from a reference terminal at a fixed location and a position of the first mobile device is determined according to the first wireless signal and the fixed location. A physical relationship is determined between the first mobile device and a second device attached to equipment and configured with an equipment certification requirement. Responsive to the physical relationship satisfying a threshold value, a comparison of the certification value of the operator and the equipment certification requirement is initiated. An operator-equipment association is generated responsive to a match between the certification value of the operator and the equipment certification requirement, wherein the operator-equipment association facilitates operator access to an operable feature of the equipment. Other embodiments are disclosed.

20 Claims, 22 Drawing Sheets

(56) References Cited

U.S. PATENT DOCUMENTS

| | | | |
|---|---|---|---|
| 2017/0041749 A1* | 2/2017 | Dowlatkhah | H04L 63/102 |
| 2017/0078897 A1 | 3/2017 | Duan et al. | |
| 2019/0033833 A1* | 1/2019 | Acharya | G05B 19/4183 |
| 2019/0111984 A2* | 4/2019 | Bean | G08B 13/126 |
| 2019/0174332 A1 | 6/2019 | Duan et al. | |
| 2019/0219665 A1 | 7/2019 | Ye et al. | |
| 2019/0222959 A1 | 7/2019 | Duan et al. | |
| 2019/0260590 A1* | 8/2019 | Kuenzi | H04W 12/08 |
| 2020/0272124 A1* | 8/2020 | Kreuzer | G07C 9/38 |
| 2020/0382902 A1 | 12/2020 | Ye et al. | |
| 2020/0404450 A1 | 12/2020 | Duan et al. | |
| 2021/0027631 A1 | 1/2021 | Ye et al. | |
| 2021/0029493 A1 | 1/2021 | Duan et al. | |
| 2021/0029500 A1 | 1/2021 | Ye et al. | |
| 2021/0251720 A1* | 8/2021 | Jhaveri | G06K 19/0723 |

* cited by examiner

300

650

| Object ID/Type 661 | Certificate(s) 662 | Supplemental Info. 663 | Other Info. 664 |

660

700

900

US 12,300,049 B2

WIRELESS, TAG-BASED MANAGEMENT OF EQUIPMENT-OPERATOR INTERACTIONS

FIELD OF THE DISCLOSURE

The subject disclosure relates to wireless, tag-based management of equipment-operator interactions.

BACKGROUND

Determining location information between objects may serve multiple purposes such as predicting and mitigating collisions between objects, tracking distances between objects, enforcing distancing between objects, inventory management, or combinations thereof. Objects may include people, mobile machinery such as forklifts and robots, vehicles controlled by individuals or driverless, or other objects for which location management and/or tracking may be desirable. Location information may correspond to distances between objects, trajectory of objects, speed of objects, positions of objects, or combinations thereof.

BRIEF DESCRIPTION OF THE DRAWINGS

Reference will now be made to the accompanying drawings, which are not necessarily drawn to scale, and wherein.

DETAILED DESCRIPTION

Figure 1:
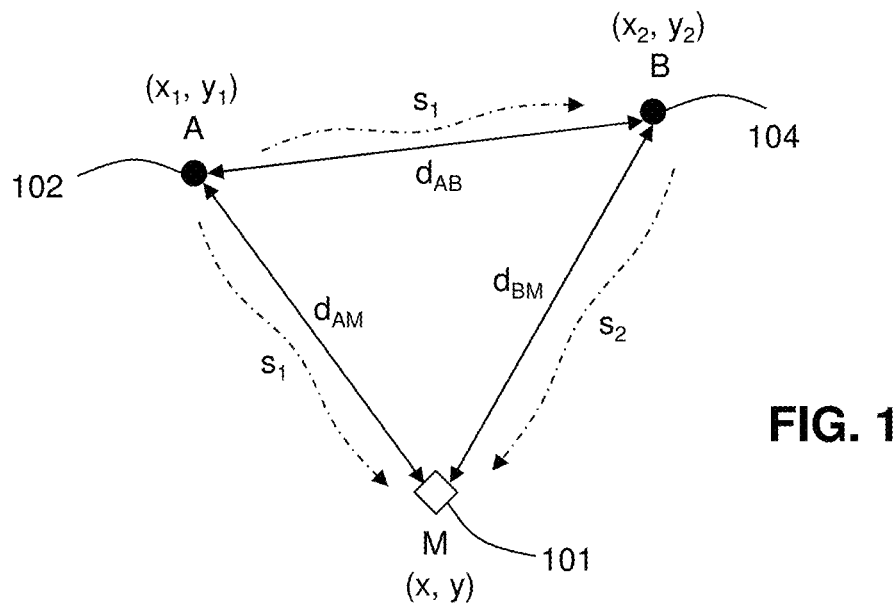
FIG. 1 is a block diagram illustrating an example, non-limiting embodiment of a mobile tag and anchors for determining location information between the mobile tag and the anchors in accordance with various aspects described herein.

The subject disclosure describes, among other things, illustrative embodiments for wireless management of interactions between equipment and equipment operators, such as establishing equipment-operator associations. Other embodiments are described in the subject disclosure.

One or more aspects of the subject disclosure include a process for storing, by a processing system comprising a processor operating within a first mobile device, a certification value of an operator to obtain a stored certificate value, wherein the first mobile device is transportable by the operator. A first wireless signal originating from a reference terminal located at a predetermined reference terminal location is received, by the processing system and via a first wireless technology. A position of the first mobile device is determined, by the processing system, according to the first wireless signal and the predetermined reference terminal location. The position is indicative of a location of the operator. A separation between the first mobile device and a second device is calculated, by the processing system. The second device is attached to equipment and configured with an equipment certification requirement. forwarding, by the processing system, the stored certification value of the operator is forwarded, by the processing system, to the second device via a second wireless technology, responsive to the separation being less than a threshold distance. The forwarding of the stored certification value enables generation of an operator-equipment association by the second device responsive to a match between the certification value of the operator and the equipment certification requirement, wherein the operator-equipment association facilitates operator access to an operable feature of the equipment.

One or more aspects of the subject disclosure include a device that utilizes a processing system including a processor and a memory that stores executable instructions that, when executed by the processing system, facilitate performance of operations. The operations may include storing, within a first mobile device, a certification value of an operator, wherein the first mobile device is transportable by the operator. The operations may further include obtaining, via a first wireless technology first wireless signal from a reference terminal at a known location and determining a position of the first mobile device according to the first wireless signal and the known location. The position is indicative of a location of the operator. The operations may further include determining a proximate relationship between the first mobile device and a second device attached to equipment and configured with an equipment certification requirement. Responsive to the proximate relationship satisfying a threshold value, the certification value of the operator is provided to the second device via a second wireless technology, to enable generation of an operator-equipment association responsive to a match between the certification value of the operator and the equipment certification requirement. The operator-equipment association facilitates operator access to an operable feature of the equipment.

One or more aspects of the subject disclosure include a machine-readable medium comprising executable instructions that, when executed by a processing system including a processor, facilitate performance of operations. The operations may include storing, at a first mobile device, a certification value of an operator, wherein the first mobile device is transportable by the operator. The operations may further include obtaining, via a first wireless technology, a first wireless signal from a reference terminal at a fixed location and determining a position of the first mobile device according to the first wireless signal and the fixed location, the position indicative of a location of the operator. A physical relationship is determined between the first mobile device and a second device attached to equipment and configured with an equipment certification requirement. Responsive to the physical relationship satisfying a threshold value, a comparison of the certification value of the operator and the equipment certification requirement is initiated. An operator-equipment association is generated responsive to a match between the certification value of the operator and the equipment certification requirement, wherein the operator-equipment association facilitates operator access to an operable feature of the equipment.

Figure 2:
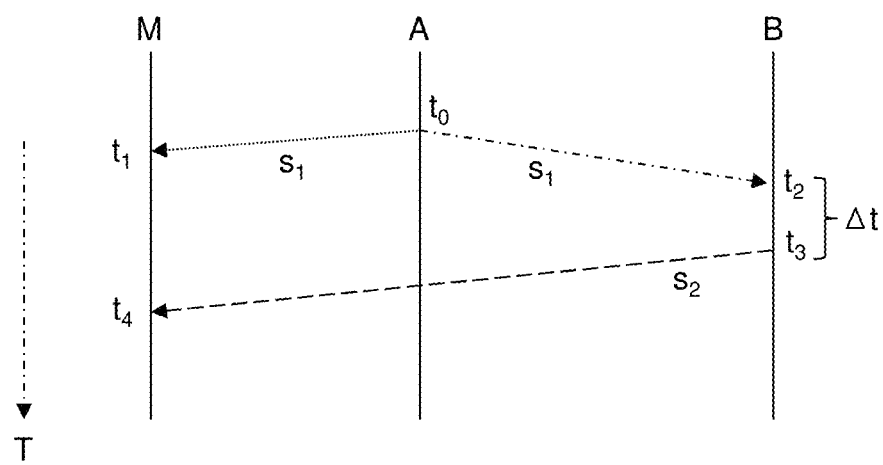
FIG. 2 is a block diagram illustrating an example, non-limiting embodiment of a timing diagram for determining location information between the mobile tag and the anchors of FIG. 1 in accordance with various aspects described herein.

FIG. 1 is a block diagram illustrating an example, non-limiting embodiment of a mobile tag 101 and first and second anchors 102 ("A") and 104 ("B") for determining location information between the mobile tag 101 ("M") and the anchors 102 and 104 in accordance with various aspects described herein. In an embodiment, the first anchor 102 may be configured to transmit a first wireless signal ($S_1$) that may be received by one or more of the second anchor 104 and the mobile tag 101. The timing of transmission of the first wireless signal by the first anchor 102 and reception of the first wireless signal ($S_1$) by the mobile tag 101 and/or the second anchor 104 is depicted in FIG. 2.

In an embodiment, the first anchor 102 transmits the first wireless signal ($S_1$) at time $t_0$, which in turn, may be received by the mobile tag 101 at a first time $t_1$ and/or by the second anchor 104 at a second time $t_2$. The second anchor 104 may be configured to transmit a second wireless signal ($S_2$) at a third time $t_3$, which may be received by the mobile tag 101 at a fourth time $t_4$. In at least some embodiments, the mobile tag 101 may be configured to use a location algorithm, such as a time difference of arrival (TDOA) measurement technique, based on one or both of the first and second wireless signals ($S_1$, $S_2$) to determine location information between the mobile tag 101 and one or more of the anchors 102 and 104 as will be described further below.

In at least some embodiments, the anchors 102 and 104 may be stationary. Accordingly, their locations in a two-dimensional (2D) and/or a three-dimensional (3D) space may be fixed. For example, according to a 2D space, the x-y coordinates of the first anchor 102, ($x_1$, $y_1$) and the second anchor 104, ($x_2$, $y_2$) and/or a distance between them ($d_{AB}$) may be made determined and/or otherwise known to the mobile tag 101, e.g., according to a look-up table provisioned into a memory of the mobile tag 101. Alternatively or in addition, the x-y coordinates of the anchors 102 and 104 and/or a distance between them ($d_{AB}$) may be made known to the mobile tag 101 by including the locations, and/or the distances, and/or other such information in a wireless message, e.g., within the first wireless signal ($S_1$), which may then be obtained by the mobile tag 101. In at least some embodiments, the mobile tag 101 may be configured to include, e.g., in its look-up table, a receive time and/or a transmit time ($t_2$, $t_3$) of signals received by and/or transmitted from the anchor 104 and/or a time difference between these times (e.g., $\Delta t = t_3 - t_2$) or may receive this information in the second wireless signal ($S_2$) transmitted by second anchor 104. One or more of the example equations that follow may be used to calculate a first possible location of the mobile tag 101 relative to one or both of the first and second anchors 102, 104.

A distance between the first anchor 102 and the mobile tag 101 ($d_{AM}$) may be represented as:

$$d_{AM} = c(t_1 - t_0) \quad \text{(EQ 1)},$$

in which c represents a signal propagation speed, such as the speed of light constant. Similarly, a distance from the first anchor 102 to the second anchor 104 ($d_{AB}$) may be represented as:

$$d_{AB} = c(t_2 - t_0) \quad \text{(EQ 2)}.$$

Alternatively or in addition, a distance from the second anchor 104 to the mobile tag 101 ($d_{BM}$) may be represented as, $$d_{BM} = c(t_4 - t_3) \quad \text{(EQ 3)}.$$

A total distance traveled by the first wireless signal ($S_1$) from the first anchor 102 to the second anchor 104 and the second wireless signals ($S_2$) from the second anchor 104 to the mobile tag 101 ($d_{AB}+d_{BM}$) may be represented as, $$d_{AB}+d_{BM}=C(t_2-t_0+t_4-t_3) \quad \text{(EQ 4A)}.$$

To eliminate the reference time variable $t_0$, the first example equation EQ 1 may be subtracted from the fourth example equation EQ 4A, resulting in, $$d_{AB}+d_{BM}-d_{AM}=c(t_2-t_1+t_4-t_3) \quad \text{(EQ 4B)}.$$

Substituting $\Delta t=t_3-t_2$ into EQ 4B results in equation, $$d_{AB}+d_{BM}-d_{AM}=c(t_4-t_1-\Delta t) \quad \text{(EQ 4C)}.$$

Since the distance between the anchors $d_{AB}$ is a constant known to the mobile tag 101 and the time variables of the factor $c(t_4-t_1-\Delta t)$ are also known to the mobile tag 101, EQ 4C may be rewritten as, $$d_{BM}-d_{AM}=\Delta d_1 \quad \text{(EQ 5)},$$

in which $\Delta d_1=c(t_4-t_1-\Delta t)-d_{AB}$, which are constants known to the mobile tag 101. Furthermore, in an example of 2D space, a distance between the first anchor 102 and the mobile tag 101 may be represented as:

$$d_{AM}=\sqrt{(x-x_1)^2+(y-y_1)^2},$$

and a distance between the second anchor 104 and the mobile tag 101 may be represented as:

$$d_{BM}=\sqrt{(x-x_2)^2+(y-y_2)^2}.$$

Substituting $d_{AM}$ and $d_{BM}$ in EQ 5 results in the following equation:

$$\sqrt{(x-x_2)^2+(y-y_2)^2}-\sqrt{(x-x_1)^2+(y-y_1)^2}=\Delta d_1. \quad \text{(EQ 6)}$$

Equation EQ 6 has only two unknown variables (x, y) that may be solved by the mobile tag 101, e.g., utilizing a non-linear regression technique (e.g., Nonlinear Least Squares). Such a technique may produce a hyperbolic curve of solutions for x and y that is associated with the positions of the anchor pairs 102, 104. Such a hyperbolic curve may be represented as, $$h_{AB}=\Delta d_1 \quad \text{(EQ 7A)},$$

in which $$h_{AB}=\sqrt{(x-x_2)^2+(y-y_2)^2}-\sqrt{(x-x_1)^2+(y-y_1)^2}.$$

Figure 3:
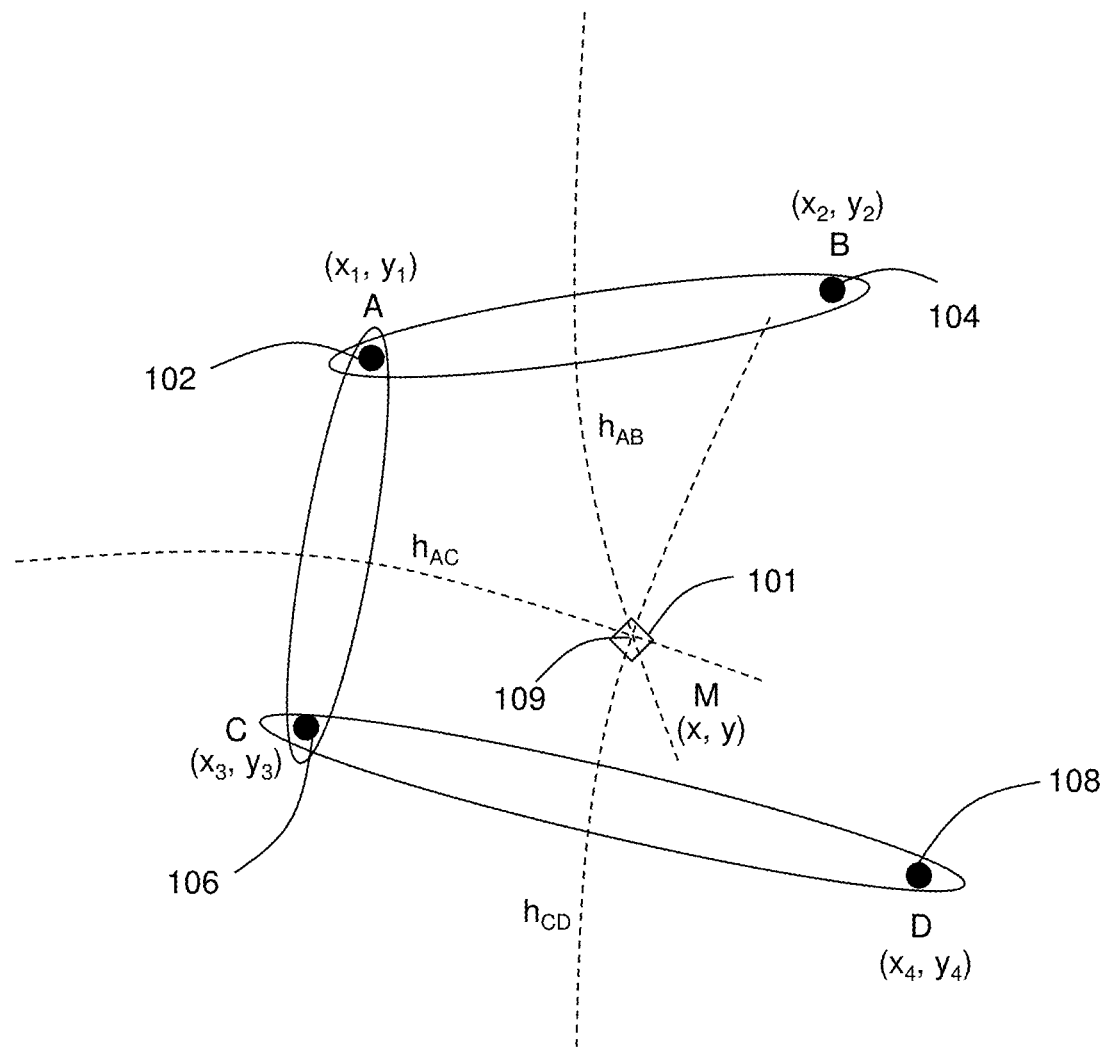
FIG. 3 is a block diagram illustrating an example, non-limiting embodiment for determining location information between the mobile tag and pairs of anchors in accordance with various aspects described herein.

The mobile tag 101 may be further configured to perform one or more of the above calculation across one or more other anchor pairs, e.g., as depicted in FIG. 3. For example, the mobile tag 101 may be configured to determine a hyperbolic curve between another pair of anchors 102 and 106 (i.e., anchors A and C) resulting in the following equation:

$$h_{AC}=\Delta d_2 \quad \text{(EQ 7B)},$$

in which $\Delta d_2$ is a constant known to mobile tag 101, and in which $$h_{AC}=\sqrt{(x-x_3)^2+(y-y_3)^2}-\sqrt{(x-x_1)^2+(y-y_1)^2}.$$

Alternatively or in addition, the mobile tag 101 may be configured to determine a hyperbolic curve between yet another pair of anchors 106 and 108 (i.e., anchors C and D) resulting in the following equation:

$$h_{CD}=\Delta d_3 \quad \text{(EQ 7C)},$$

in which $\Delta d_3$ is a constant known to mobile tag 101, and in which $$h_{CD}=\sqrt{(x-x_4)^2+(y-y_4)^2}-\sqrt{(x-x_3)^2+(y-y_3)^2}.$$

The intersection 109 of hyperbolic curves $h_{AB}$, $h_{AC}$ and $h_{CD}$ corresponding to equations EQ 7A-7C may provide a two-dimensional coordinate location (i.e., x, y) for the mobile tag 101 relative to anchors pair 102 and 104 (anchors A/B), anchor pair 106 and 108 (anchors A/C) and/or anchor pair 106 and 108 (anchors C/D). It may be appreciated that the mobile tag 101 may also be configured to determine a three-dimensional coordinate (i.e., x, y, z) of its location by utilizing a fourth pair of anchors.

To enable the above calculations, the pairs of anchors utilized by the mobile tag 101 must satisfy a coverage area that encompasses the anchor pairs and the mobile tag 101. For example, referring to FIG. 4A, the coverage area of anchor 102 (anchor "A") is defined by reference 110, while the coverage area of anchor 104 (anchor "B") is defined by reference 112. The overlapping region 114 represents the coverage area that is jointly shared by anchors 102 and 104. Since the second anchor 104 and the mobile tag 101 must be able to receive the first wireless signal ($S_1$) generated by the first anchor 102, the second anchor 104 and the mobile tag 101 must be located in the overlapping region 114. Additionally, the mobile tag 101 must be in the overlapping region 114 in order to receive the second wireless signal ($S_2$) generated by the second anchor 104. Conditions such as described above for the first anchor pair 102, 104 (anchors A/B) must also be satisfied by the other anchor pairs, e.g., a second anchor pair 102, 106 (anchors A/C) and a third anchor pair 106, 108 (anchors C/D) in order to enable the mobile tag 101 to perform location calculations, such as the example triangulation calculations described above for hyperbolic curves $h_{AB}$, $h_{AC}$ and $h_{CD}$.

Figure 4A:
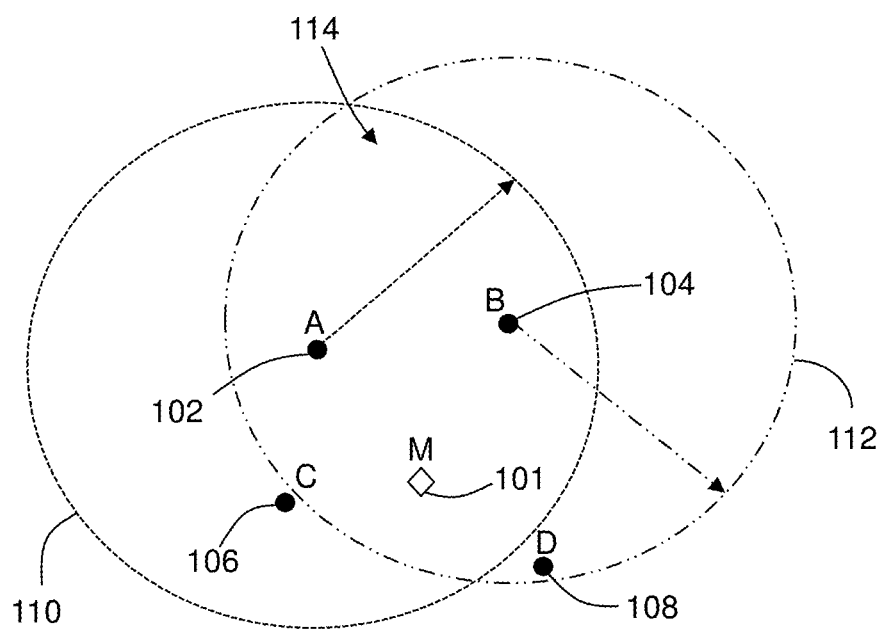
FIGS. 4A, 4B and 4C are block diagrams illustrating example, non-limiting embodiments for selecting pairs of anchors in accordance with various aspects described herein.
Figure 4B:
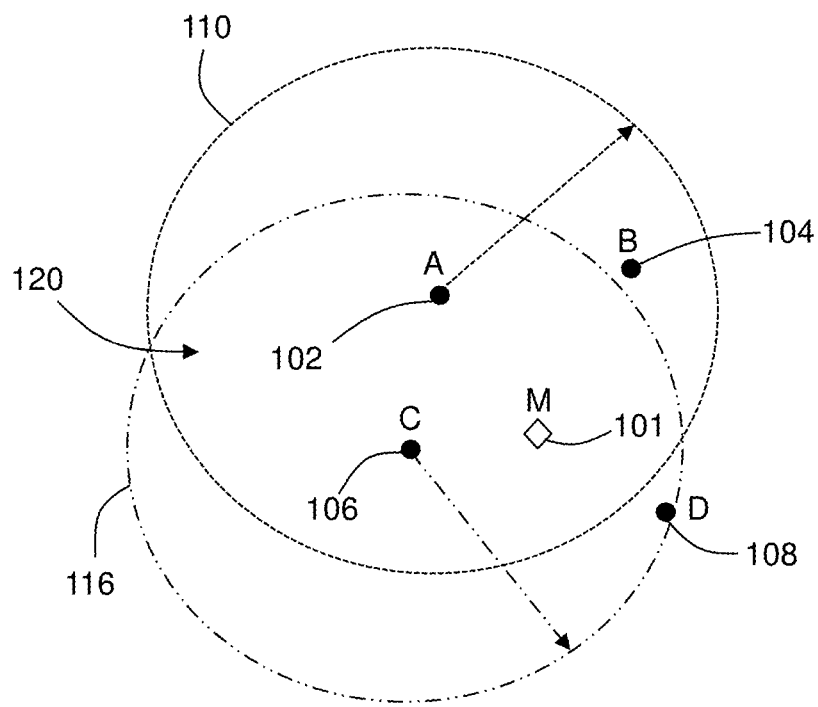
Figure 4C:
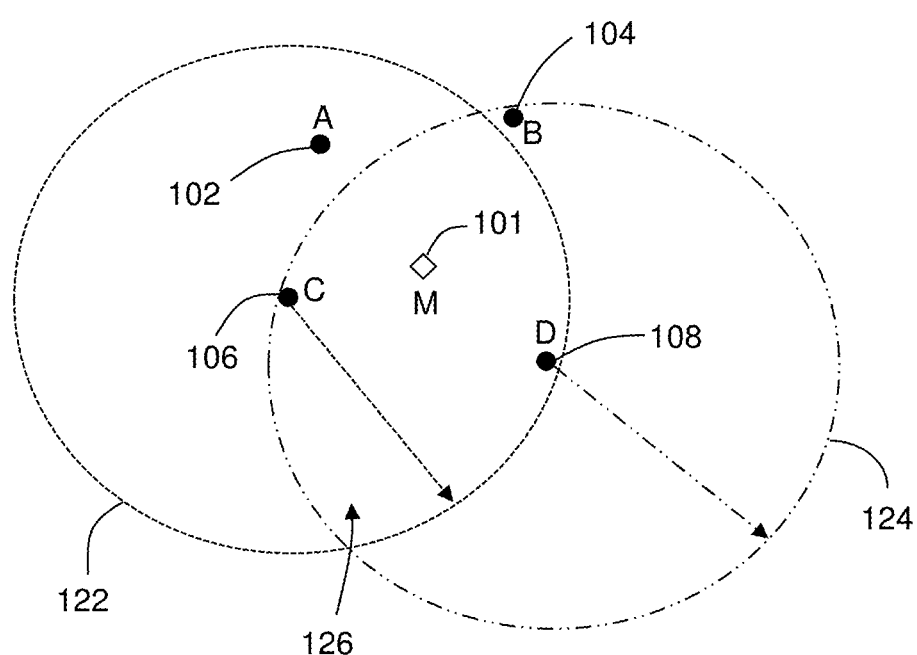

FIG. 4B shows that the coverage areas 110 and 116 of the anchor pair 102, 106 (anchors A/C), respectively, creates an overlapping region 120 that encompasses the anchors 102 and 106 and the mobile tag 101, thereby enabling the mobile tag 101 to calculate hyperbolic curve $h_{AC}$. Additionally, FIG. 4C shows that the coverage areas 122 and 124 of the anchor pair 106, 108 (anchors C/D), respectively, creates an overlapping region 126 that encompasses the anchors 106 and 108 and the mobile tag 101, thereby enabling the mobile tag 101 to calculate hyperbolic curve $h_{CD}$.

Figure 5:
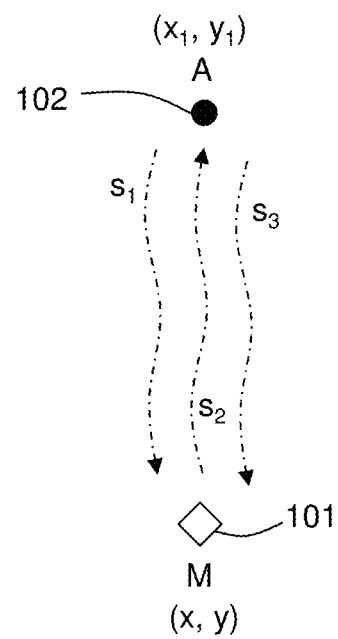
FIG. 5 is a block diagram illustrating an example, non-limiting embodiment of a mobile tag and an anchor for determining location information between the mobile tag and the anchor in accordance with various aspects described herein.
Figure 6:
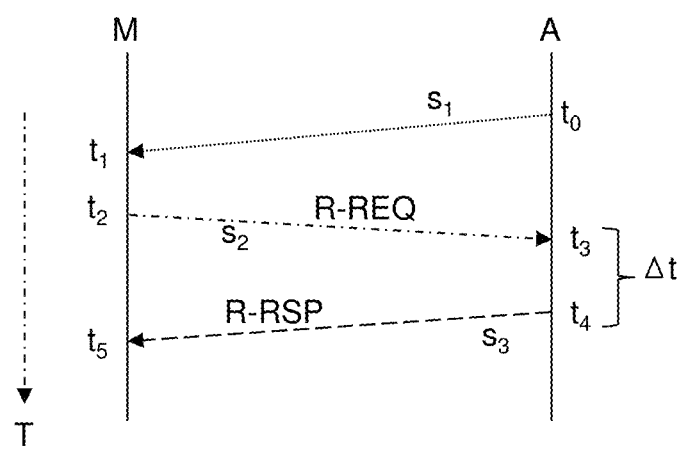
FIG. 6 is a block diagram illustrating an example, non-limiting embodiment of a timing diagram for determining location information between the mobile tag and the anchor of FIG. 5 in accordance with various aspects described herein.

FIG. 5 depicts another embodiment for determining location information between the mobile tag 101 and the first anchor 102. In this embodiment, the mobile tag 101 may be configured to use a two-way time of arrival (TW-TOA) process for determining a distance between itself and the first anchor 102. Optionally, the process may begin at the first anchor 102, which transmits a first wireless signal ($S_1$) received by the mobile tag 101 at a first time $t_1$. The first wireless signal ($S_1$) may include the x-y coordinates ($x_1$, $y_1$) of the first anchor 102. Upon receiving the first wireless signal ($S_1$), the mobile tag 101 may be configured to transmit a second wireless signal ($S_2$), which may represent a range request (R-REQ) signal directed to the first anchor 102 initiated by the mobile tag 101 at a second time $t_2$ and received by the first anchor 102 at a third time $t_3$.

Upon receiving the R-REQ signal at the third time $t_3$, the first anchor 102 may process the R-REQ signal and initiate at a fourth time $t_4$ a transmission of a third wireless signal ($S_3$) representing a range response (R-RSP) signal that is received by the mobile tag 101 at a fifth time $t_5$. The time to process the R-REQ signal and transmit the R-RSP signal may be represented by $\Delta t = t_4 - t_3$, which may be communicated to the mobile tag 101 via the third wireless signal ($S_3$).

The mobile tag 101 may be configured to determine a roundtrip distance based on the formula:

$$d_{r\text{-}trip} = d_{AM} + d_{MA},$$

in which the value $d_{r\text{-}trip}$ represents a roundtrip distance from the mobile tag 101 to the first anchor 102 and back to mobile tag 101, the value $d_{MA}$ represents the distance from the mobile tag 101 to the first anchor 102, and the value $d_{AM}$ represents the distance from the first anchor 102 to the mobile tag 101. The distance from the mobile tag 101 to the first anchor 102 may be determined by:

$$d_{MA} = c(t_3 - t_2).$$

Similarly, the distance from the first anchor 102 to the mobile tag 101 may be determined by:

$$d_{AM} = c(t_5 - t_4).$$

With the above equations, the roundtrip distance may be rewritten as:

$$d_{r\text{-}trip} = c(t_5 - t_4 + t_3 - t_2).$$

As noted earlier, the time to process the R-REQ signal and transmit the R-RSP signal via the first anchor 102 may be represented as $\Delta t = t_4 - t_3$. The first anchor 102 may be configured to transmit the value of $\Delta t$ in the R-RSP signal for use by the mobile tag 101 in calculating the value $d_{r\text{-}trip}$. Substituting $\Delta t$ in $d_{r\text{-}trip}$ results in the formula:

$$d_{r\text{-}trip} = c(t_5 - t_2 - \Delta t).$$

Since the values of $t_5$, $t_2$, and $\Delta t$ are known to the mobile tag 101, the mobile tag 101 may readily calculate the value $d_{r\text{-}trip}$. The mobile tag 101 may also calculate the distance from the mobile tag 101 to the first anchor 102 based on the formula, $$d_{MA} = d_{r\text{-}trip}/2.$$

It will be appreciated that the mobile tag 101 may also be configured to know a priori the fixed value of $\Delta t$ thus eliminating the need to transmit the value of $\Delta t$ in the R-RSP signal. This knowledge may be based on a pre-provisioning of the mobile tag 101 with this information prior to deployment, and/or retention of a record of a prior determination of the value $\Delta t$. In yet another embodiment, the processing time to receive the R-REQ signal and respond with the transmission of the R-RSP signal may be a fixed processing time interval known and used by all devices in a network performing TW-TOA analysis. It will be further appreciated that the R-REQ and the R-RSP signals may be transmitted using ultra-wideband signaling technology to increase the accuracy of the $d_{r\text{-}trip}$ calculations. Accordingly, the TW-TOA illustrated in FIG. 5 may be used by either the mobile tag 101 or anchors in other embodiments to calculate a relative distance between each other.

It will be appreciated that one or more of the TDOA and TW-TOA processes described above may also between mobile tags 101. For example, FIGS. 1-3, 4A-4C, and 5-6 may be adapted so that the anchors are replaced with mobile tags 101. In this embodiment, mobile tags 101 may use TDOA or TW-TOA to obtain location information amongst each other based on the processes described earlier for TDOA and TW-TOA, respectively.

It will be further appreciated that a mobile tag 101, depicted in FIGS. 1, 3, 4A-4C, 5, may be configured with multiple antennas and phase detectors to calculate an angle of arrival of any wireless signal generated by an anchor and received by the mobile tag 101 based on a phase difference between the antennas determined from the received wireless signal. An angle of arrival calculation may be used to determine an angular orientation between a mobile tag 101 and an anchor. It will be further appreciated that the mobile tags 101 may be configured to determine a speed of travel of the mobile tag 101 by performing multiple location measurements over a time period. With angular orientation and speed of travel, a mobile tag 101 may also determine its trajectory of travel. Alternatively, the mobile tags 101 may be configured with an orientation sensor (e.g., a magnetometer) to determine an angular orientation with an anchor.

Figure 7:
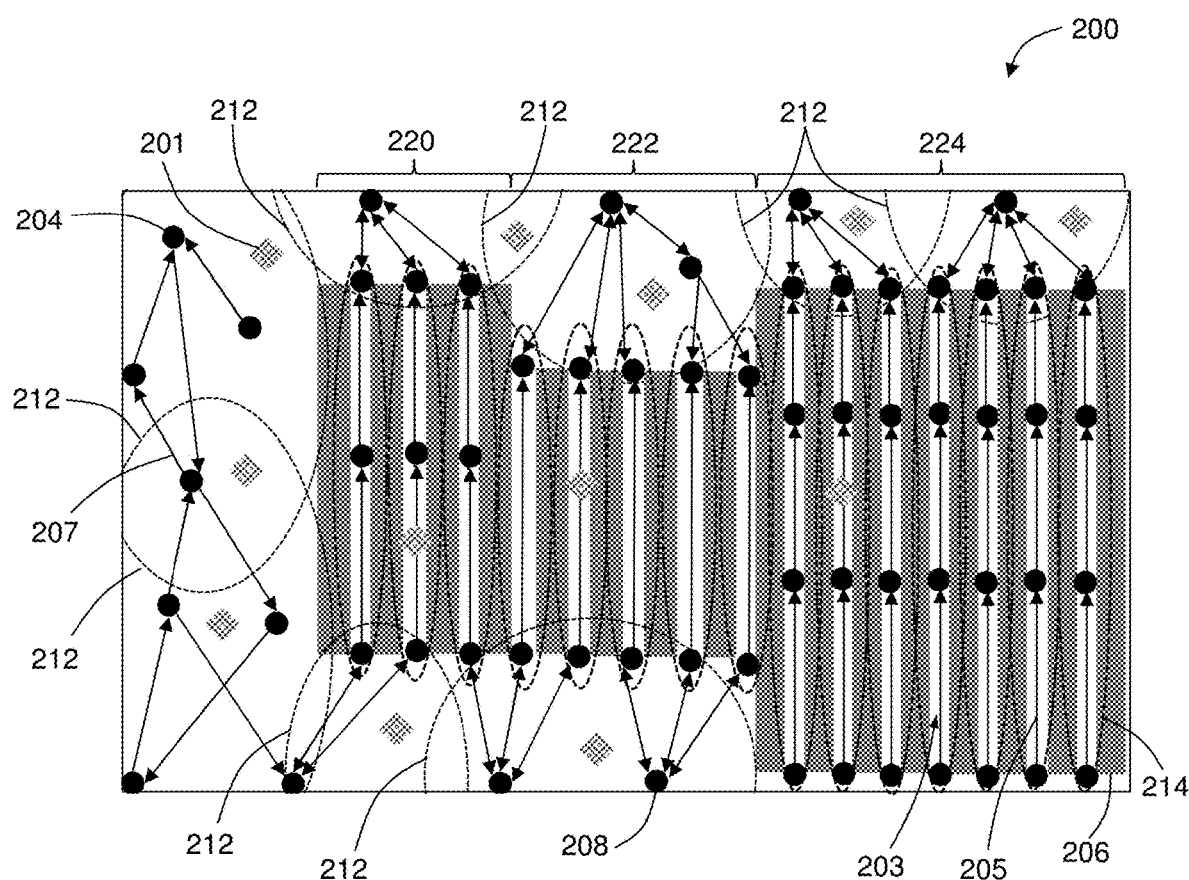
FIG. 7 is a block diagram illustrating an example, non-limiting embodiment for determining location information of mobile tags in a demarcated area in accordance with various aspects described herein.

As will be discussed shortly, TDOA, TW-TOA, angular orientation, speed of travel, or combinations thereof may be utilized in an environment such as illustrated in FIG. 7.

FIG. 7 is a block diagram illustrating an example, non-limiting embodiment for determining location information of mobile tags 201 in a demarcated area 200 in accordance with various aspects described herein. In the illustration of FIG. 7, the demarcated area 200 may represent a warehouse with racks or shelves 206 for managing the distribution of products and/or materials. It will be appreciated that the demarcated area 200 may correspond to numerous other use cases, including without limitation, a parking lot for managing parking spots, a commercial or retail environment for monitoring individuals and/or assets, assisted navigation of vehicles and/or machinery such as robots or forklifts, collision detection and avoidance of objects, managing separation between objects and/or individuals, as well as other suitable applications for which the subject disclosure may be applied to. For illustration purposes only, the demarcated area 200 of FIG. 7 will be considered a warehouse with racks and/or shelves 206.

The measurement technique used by the mobile tags 201 to determine location information within the demarcated area 200 may depend on the location of the mobile tags 201 relative to other anchors 204 in the demarcated area 200. For example, when a mobile tag 201 is located in sections 212 (i.e., open spaces without shelving 206 and line-of-site to pairs of anchors 204), the mobile tag 201 may be configured to perform TDOA measurements among pairs of anchors 204 as described above in relation to FIGS. 1, 2, 3, 4A, 4B, 4C. On the other hand, when the mobile tag 201 is located in an aisle 203 between racks/shelves 206, the mobile tag 201 may be configured to perform TW-TOA measurements among one or more anchors 204 located in the aisle 203 as described above in relation to FIGS. 5-6.

Additionally, an aisle 203 may be configured with two or more anchors 204. An aisle 203 may have more than two anchors 204 when the coverage area of a first anchor 204 at one end of the aisle 203 has insufficient coverage to reach a second anchor 204 at the other end of the aisle 203 and vice-versa—see sections 220 and 224. However, when the coverage area of a first anchor 204 at one end of the aisle 203 has sufficient coverage to reach a second anchor 204 at the end of the aisle 203 and vice-versa, then no more than two anchors 204 would be necessary in the aisle 203—see example region 222 in which two tags 204 provide sufficient coverage for the shorter aisles 203.

Figure 8:
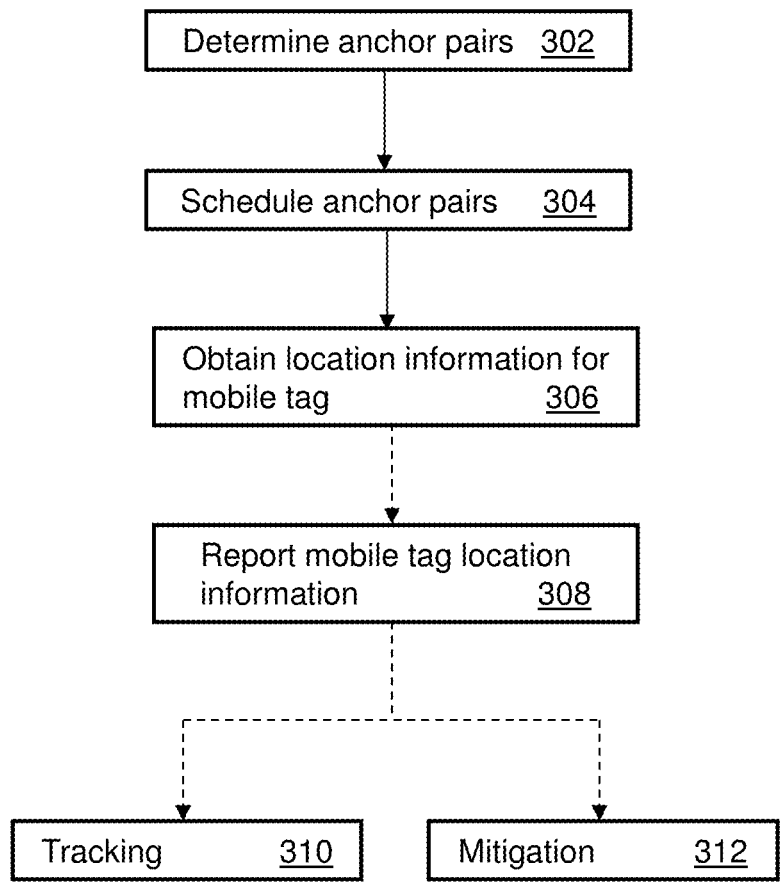
FIG. 8 depicts an illustrative embodiment of a method for determining location information and uses thereof in accordance with various aspects described herein.

FIG. 8 depicts an illustrative embodiment of a process 300 in accordance with various aspects described herein. The process 300 may begin at step 302, in which a computing system such as a server (e.g., described below in relation to FIG. 11) is configured to identify anchor pairs in the demarcated area 200 of FIG. 7 that provide sufficient coverage to enable TW-TOA and/or TDOA measurements depending on the location of the mobile tags 201.

In the case of open spaces, like region 212 (repeated in several portions of the example demarcated area 200 of FIG. 7), the mobile tags 201 are configured to use TDOA measurement techniques to determine location information. To enable TDOA measurements, the server may be configured at step 302 to identify, e.g., for a certain number of x-y coordinates obtained from a digitization of an open space defined by region 212 where a mobile tag 201 may be located, at least three pairs of anchors 204 that have overlapping coverage that satisfy the condition described earlier in relation to FIGS. 3, 4A, 4B and 4C. It may be appreciated that other techniques other than digitization of an open space may be used to identify possible x-y coordinates used by the server to perform step 302. In the case of spaces formed by aisles 203, like region 214 (repeated in several portions of the demarcated area 200 of FIG. 7), the mobile tags 201 may be configured to use TW-TOA measurement techniques to determine location information. To enable TW-TOA measurements, the server may be configured at step 302 to identify at least two anchors 204 covering at least a portion of the aisle 203. The mobile tags 201 may be configured to perform TW-TOA with anchors 204 at opposite ends of an aisle 203 to provide further accuracy and/or at least validate location information determined by the mobile tag 201. As noted earlier, pairs of anchors 204 may be located at opposite ends of an aisle 203, and/or in between aisles 203 when a single pair of anchors 204 is unable to cover for the full-length of an aisle 203. The mobile tag 201 may be configured to perform TW-TOA measurement according to the embodiments described above in relation to FIGS. 5-6.

For open spaces such as region 212, a server may be configured at step 302 to determine optimal pairs of anchors 204 in FIG. 7 that provide sufficient coverage for any mobile tag 201 in the area, such as the region 212, to perform triangulation with at least three pairs of anchors 204 that satisfy the conditions set forth in FIGS. 4A-4C. The process of selecting anchor pairs for TDOA triangulation and optimal coverage in open spaces defined by region 212 may be performed as an iterative analysis by a server at step 302, and/or by other techniques that enable convergence to a solution that provides coverage to the mobile tags 201 across most (if not all) open spaces depicted by the region 212. In the case of spaces defined by aisles 203, the server may identify the anchor pairs 204 in the aisles 203 that provide sufficient coverage to cover the aisle from end-to-end as illustrated by sections 220-224 of FIG. 7.

Figure 9:
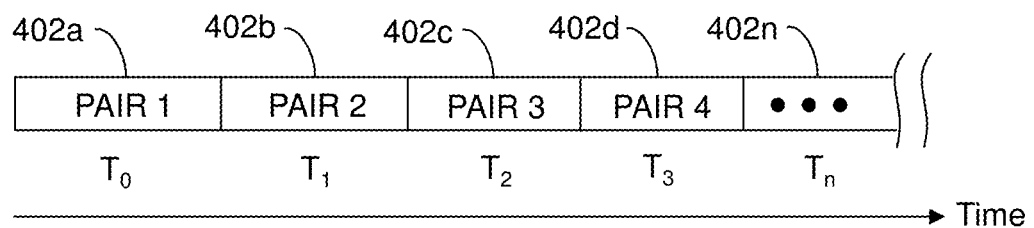
FIG. 9 is a block diagram illustrating an example, non-limiting embodiment for scheduling a process for determining location information between mobile tags and pairs of anchors in the demarcated area of FIG. 7 in accordance with various aspects described herein.

Once the anchor pairs 204 have been identified, the server may proceed to step 304 to identify a schedule for communications between anchor pairs 204 and one or more mobile tags 201. In one embodiment, the anchors 204 may be configured to transmit and receive wireless signals in a single frequency band. A single frequency band for performing TDOA or TW-TOA measurements may reduce the design complexity of mobile tags 201 and corresponding costs. To avoid collisions between anchor pairs 204 transmitting in a same frequency band near other anchors, the server may be configured to utilize a time-division scheme (timeslots) such as the example timeslots shown in FIG. 9 to enable anchor pairs 204 to communicate with each other and with one or more mobile tags 201 without causing signal interference (i.e., wireless collisions).

To achieve this, the server may be configured, for example, to determine at step 304, which anchor pairs 204 have overlapping coverage areas with other anchor pairs and schedule the communications between the anchor pairs and the mobile tags 201 during specific timeslots $T_0$-$T_n$, e.g., timeslots 402a through 402n, generally 402. In the case in which a pair of anchors 204 does not have an overlapping coverage area with another anchor pair (e.g., anchor pairs at opposite ends of the demarcated area 200), the server may schedule simultaneous wireless communications of both anchor pairs 204 during a same timeslot (not shown in FIG. 9). As part of the scheduling process shown in FIG. 9, the server may be further configured at step 304 to determine which of the anchor pairs 204 will initiate/start a measurement session through a transmission of wireless signal ($S_1$). Such anchors 204 may be referred to herein as source anchors 204.

In one embodiment, the anchor pairs 204 identified by the server at step 302, and the transmission schedule and source anchors 204 determined by the server at step 304 may be communicated to all anchors 204 via gateway anchors 208 communicatively coupled to the server. Gateway anchors 204 may be located at the edges of the demarcated area 200 or in other locations of the demarcated area 200. Additionally, the server may also be configured to share the identification of the anchor pairs 204 and transmission schedules with the mobile tags 201. This information may be conveyed by gateway anchors 208 (FIG. 7) when the mobile tags 201 are in close vicinity thereto, or by way of other anchors 204 which may be configured to obtain this information from the gateway anchors 208 and relay the information to the mobile tags 201.

It will be appreciated that the locations of the anchors 204 in FIG. 7 may be predefined before the implementation of step 302 by the server. That is, the anchors 204 may be placed by one or more individuals managing the placement of shelves/racks, etc., in the demarcated area 200. The specific x-y coordinate locations of the anchors 204 may be determined by such individuals and communicated to the server via, for example, a look-up table provided to the server, in order to perform step 302.

It will be further appreciated that in other embodiments, the location of anchors may instead be determined by the server at step 302. In this embodiment, the server may be provided with the location of racks/shelves and/or other objects in the demarcated area 200 along with dimensions of the demarcated area 200 and dimensions of the racks/shelves and/or other objects. The server may then be configured to perform an iterative analysis to determine a location for anchors 204 relative to the racks/shelves identified to the server that provide desirable coverage for mobile tags 201 to perform TDOA analysis in open spaces or TW-TOA analysis in aisles 203. In this embodiment, the server may be configured to report the x-y coordinate locations of the anchors 204 to one or more personnel managing the floor space of the demarcated area 200 for placement of the anchors 204 in their corresponding x-y coordinate locations.

It will be further appreciated that once the anchors 204 have been placed in their designated locations determined by the server, the server may be configured to provide the x-y coordinates to all anchors 204 in the demarcated area 200 either directly and/or via gateway anchors 208 as described above. This information may also be conveyed by gateway anchors 208 when the mobile tags 201 are in close vicinity thereto, or by way of other anchors 204 which may be configured to obtain this information from the gateway anchors 208 and relay the information to the mobile tags 201.

Referring back to FIG. 8, at step 306, the mobile tags 201 may be configured to initiate a process using TDOA and/or TW-TOA (and in some instances angular orientation measurements) to obtain location information depending on the location of the mobile tag 201 in the demarcated area 200. In one or more embodiments (although other techniques may be utilized) to assist mobile tags 201 in identifying whether they are in region 212 (i.e., open spaces) or region 214 (i.e., aisles 203), the source anchors 204 may be configured to transmit in the first wireless signal ($S_1$) an indication whether to use TDOA or TW-TOA. The indication may be a flag or message that enables the mobile tag 201 to determine whether it is in region 212 (an open space) or region 214 (an aisle 203). The first wireless signal ($S_1$) may also convey to the mobile tag 201 the x-y coordinates of one or both anchor pairs 204. Alternatively, the mobile tags 201 may be configured with a look-up table that includes the x-y coordinates of all anchors 204 in the demarcated area 200. The mobile tags 201 may obtain the lookup-table from the server via the gateway anchors 208 or during provisioning of the mobile tag 201 by a user before the mobile tag 201 is deployed for use in the demarcated area 200. It will be further appreciated that step 306 may be adapted to enable mobile tags 101 to measure and thereby obtain location information between each other using TDOA or TW-TOA as described earlier in relation to FIGS. 1-3, 4A-4C, and 5-6.

Once a mobile tag 201 calculates location information, e.g., via TDOA and/or TW-TOA measurement techniques, the mobile tag 201 may in turn report at step 308 the location information to other devices such as other mobile tags 201, the anchors 204 in its coverage area, and/or the server by communicating directly to one or more gateway anchors 208 or indirectly via one or more intermediate mobile tags 201 and/or one or more intermediate anchors 204 that may communicate with the one or more gateway anchors 208. The location information may include, without limitation, one or more of coordinates of the mobile tag 201, e.g., x-y and/or x-y-z coordinates within the demarcated area 200, a speed of travel of the mobile tag 201, absolute and/or relative to another object, determined from multiple location measurements over a time period, a trajectory of the mobile tag 201, angular orientation of the mobile tag 201 relative to other anchors 204 and/or other mobile tags 201, an elevation of the mobile tag 201, e.g., an elevation relative to another object, such as another mobile tag 201 and/or an anchor 204, and/or any combinations thereof. Since sharing location information may not require precision measurements, e.g., via ultra-wideband signals, the mobile tags 201 may be configured to share location information with other devices using lower power wireless signaling techniques such as may be used according to a local area network protocol, Bluetooth®, ZigBee®, WiFi, a near field communications protocol, a free-space optical communications protocol, an infrared communications protocol, an ultrasound communications protocol and/or any other suitable wireless signaling protocols.

Sharing location information of the mobile tags 201 enables the server and/or other devices such as the anchors 204 and other mobile tags 201 to track at step 310 movement and location of the mobile tags 201 and detect and perform mitigation procedures at step 312. For example, mobile tags 201 may be configured to detect issues such as proximity violations and/or possible collisions between mobile tags 201 from this shared information. Upon detecting such issues, the mobile tags 201 may be configured to assert an alarm (audible and/or visual) and/or take further mitigation action such as slow down or otherwise disable a vehicle (e.g., a forklift, robot, automobile, etc.) that may collide with an individual carrying a mobile tag 201. The mobile tag 201 may be integrated in an identification badge or embedded in a mobile communication device (e.g., mobile phone, tablet, etc.), clipped on a shirt, integrated into an article of clothing of the individual, an accessory, such as a belt, a watch, a ring, a cap or helmet, a shoe or boot, a vest and/or otherwise carried by the individual via other suitable methods for carrying the mobile tag 201.

In at least some embodiments, the mobile tag 201 may be held by, attached to and/or otherwise integrated into virtually any object, such as a vehicle, construction equipment, a machine, a tool, a container, an electrical and/or electronic device, an architectural element, virtually any type of asset, such as a mechanical part or component, e.g., a part of a turbine, a metal detail, a container, e.g., a box, a rack, and so on. In other examples, the mobile tag 201 may be held by, attached to and/or otherwise integrated into a robot, e.g., a self-driving robot, a self-driving car, and the like. Examples of vehicles, operator controlled and/or autonomous, may include without limitation, a forklift, a hand truck, an automobile, a bus, a truck, a train, a boat, an airplane, a shipping trailer, and the like. Examples of machines may include without limitation, manufacturing machinery, including conventional machinery, casting machinery, chemical processing machinery, electrical processing machinery, machinery monitoring and/or control equipment, lifting, positioning and/or moving machinery, e.g., overhead cranes, robotics in manufacturing, and the like. Examples of construction equipment may include without limitation, a crane, a tower crane, an excavator, a backhoe, a bulldozer, a grader, a loader, a paver, a dump truck. Examples of a tool may include without limitation, a boring tool, a cutting tool, a drilling tool, a milling tool, a turning tool, a burning and/or welding tool. Examples of a container may include without limitation, a shipping container, a trailer, a safe, a vault, a cabinet, a garage, and the like. Examples of an architectural element may include without limitation, a building, a door, a window, a lift or elevator, a shed, and the like. Examples of an electrical and/or electronic device may include without limitation, a computing device, such as a personal computer, a laptop and/or a tablet device, a communication device, such as a smart phone, a lighting device, a display device, a user interface, a control device, such as an environmental controller, a lighting controller a security system controller, and more generally office equipment, such as computers, printers, scanners, copiers, and the like.

It will be appreciated that process 300 may be adapted for other embodiments contemplated by the subject disclosure. For example, at step 306, a mobile tag 201 may be adapted to obtain location information based on a determination whether it is in an open space defined by region 212 or an aisle 203 defined by region 214. A mobile tag 201, for example, may receive wireless signals from both an anchor 204 in an open space and an anchor 204 in an aisle 203. To determine whether to perform a TDOA measurement or a TW-TOA measurement, the mobile tag 201 may be configured to obtain from its internal memory a history of locations in the demarcated area 200 that are stored by the mobile tag 201 to determine if the most recent location (or trajectory of the mobile tag 201) places the mobile tag 201 in an open space, region 212, or aisle 203, region 214.

If the mobile tag 201 determines it is likely in an open space, region 212, it may proceed to perform TDOA analysis based on the wireless signals generated by anchor pairs 204 in the open space. Otherwise, if the mobile tag 201 determines it is likely in an aisle, region 214, it may proceed to perform TW-TOA analysis based on the wireless signals generated by anchor pairs 204 in the aisle 203. If the mobile tag 201 is unable to make a determination where it is likely located from a history of locations, the mobile tag 201 may be configured to perform TDOA analysis based on the wireless signals generated by anchor pairs 204 in the open space and TW-TOA analysis based on the wireless signals generated by anchor pairs 204 in the aisle 203. The mobile tag 201 may be configured to compare the location determined from TDOA and the location determined from TW-TOA to the stored location history and thereby make a determination as to which location to choose that more closely mimics the location history of the mobile tag 201.

While for purposes of simplicity of explanation, the respective processes are shown and described as a series of blocks in FIG. 8, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein. For example, steps 308-312 may be optional.

Figure 10:
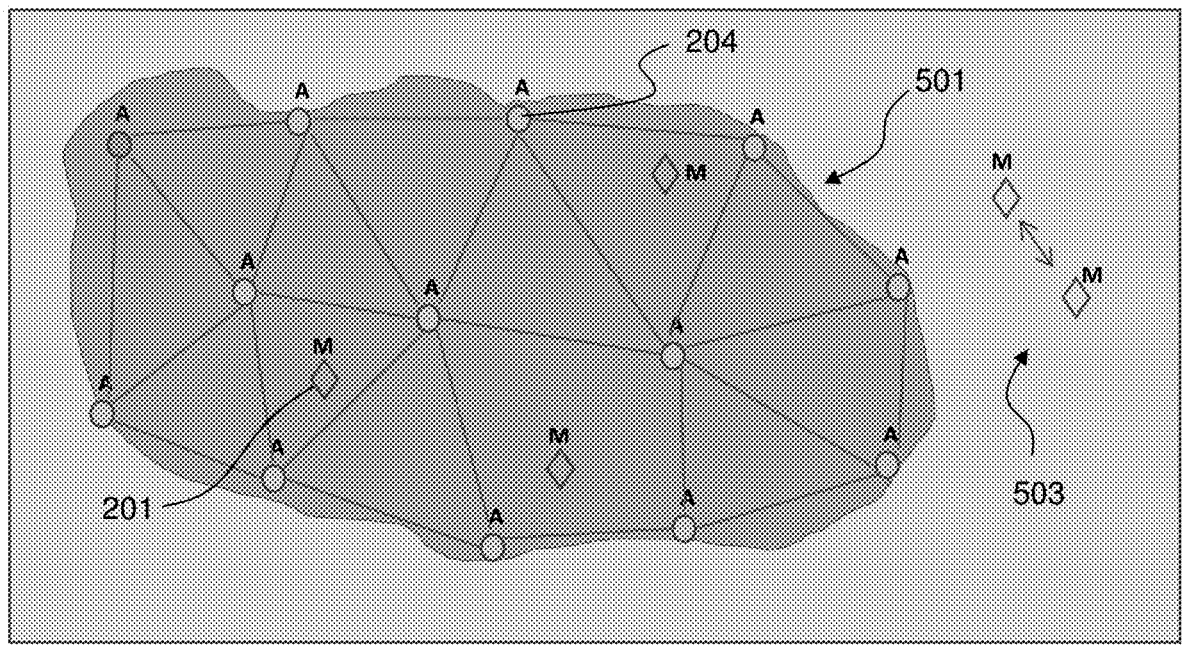
FIG. 10 is a block diagram illustrating an example, non-limiting embodiment of environments where mobile tags may operate from in accordance with various aspects described herein.

FIG. 10 is a block diagram illustrating an example, non-limiting embodiment of environments where mobile tags may operate from in accordance with various aspects described herein. Mobile tags 201 may at certain times operate within a network 501 of anchors 204 (such as described above in FIG. 7) to obtain their location as described above. However, users (or vehicles or other mobile devices) carrying a mobile tag 201 may transition to an open space 503 that is outside of the coverage of the network 501. When this occurs, the mobile tags 204 may be configured to transition to peer-to-peer communications (i.e., tag-to-tag communications) to continue to obtain location information relative to other mobile tags in the open space 503.

Figure 11:
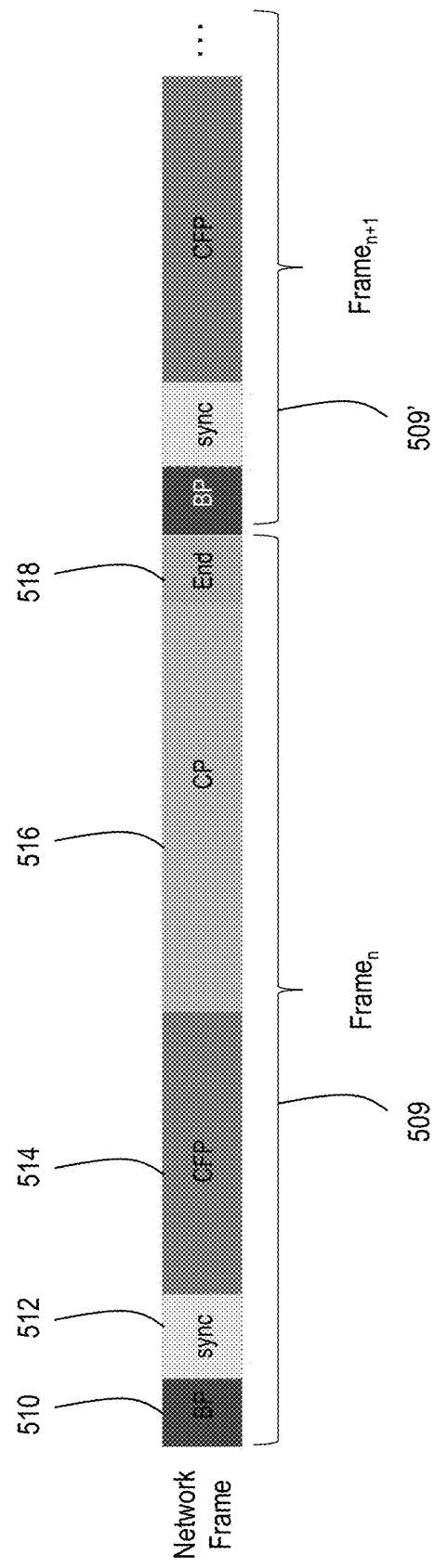
FIG. 11 is a block diagram illustrating an example, non-limiting embodiment of a network frame in accordance with various aspects described herein.

FIG. 11 is a block diagram illustrating an example, non-limiting embodiment of a network frame 509 that may be utilized by the network 501 (FIG. 10) in accordance with various aspects described herein. The network frame 509 may include one or more of a beacon signal, e.g., during a beacon period (BP) 510, a sync period 512, a contention-free period (CFP) 514, a contention period (CP) 516, and an end period 518. A beacon signal, e.g., provided during the BP 510, may be generated by one or more of the anchors 204 to provide the anchors 204 and/or the mobile tags 201 a means for synchronization. The CFP 514 portion of the frame 509 may support downlink TDOA (DL-TDOA) ranging packets, which in turn, may also support the anchor pair scheduling depicted in FIG. 9. In the present example context, the term "downlink" signifies communications from an anchor 204 to a mobile tag 201, while the term "uplink" signifies communications from a mobile tag 201 to an anchor 204. Transmissions during the CFP 514 portion may be scheduled to avoid simultaneous transmissions that might otherwise lead to wireless signal interference. The CP 516 portion of the frame 509 may support one or more of uplink TDOA (UL-TDOA), TW-TOA ranging packets and/or additional data packets/control signaling packets that may be subject to simultaneous transmissions that in turn may interfere with each other.

The sync period 512 (which may be optional) may provide a relatively short buffer period, e.g., for anchors 204 and/or mobile tags 201 to synchronize the start of the CFP 514 to each other. The end period 518 (which may be optional) may provide a relatively short buffer period for a next frame 509' preparation or may serve as guard interval, e.g., for acknowledgment (ACK) message transmissions. The network frame 509 may be periodic as shown by the next repetitive sequence of fields in the subsequent network frame 509'. Various other scheduling and timing, including use of particular frame structures may be used with the example embodiments of the subject disclosure as described in U.S. Pat. No. 10,779,118, filed Jan. 11, 2019, to Duan et al., the disclosure of which is hereby incorporated by reference herein in its entirety.

Figure 12:
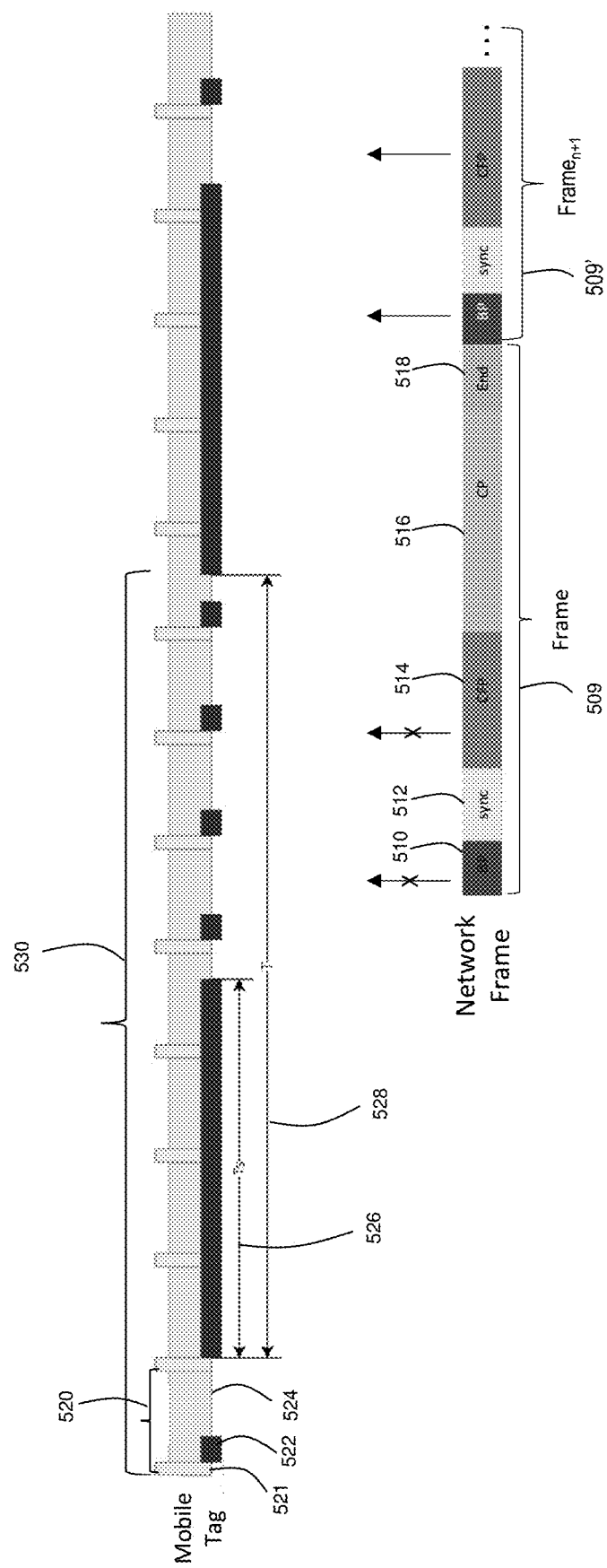
FIG. 12 is a block diagram illustrating an example, non-limiting embodiment of a peer-to-peer frame configured for monitoring a presence of a network frame in accordance with various aspects described herein.

FIG. 12 is a block diagram illustrating an example, non-limiting embodiment of a peer-to-peer (P2P) frame configured for monitoring a presence of a network frame 509 in accordance with various aspects described herein. The P2P frame is referred to herein as a P2P super-frame 530. The P2P super-frame 530 may include a P2P sub-frame 520 and/or a network sub-frame 528. The P2P sub-frame 520 enables a mobile tag 201, e.g., located in the open space 503 of FIG. 10, to perform peer-to-peer range measurements as will be describe in FIGS. 14A-14D below. The P2P sub-frame 520 may include one or more of a P2P beacon signal 521, a ranging period 522, and listening period 524.

The P2P beacon signal 521 may be provided to a communications protocol, such as a Bluetooth (or ultra-wideband) signal, that a mobile tag 201 may broadcast to other mobile tags 201, e.g., to initiate a ranging process to determine the relative location of the mobile tag 201 to other mobile tags 201 within its vicinity. The P2P beacon signal 521 may include an announcement message and/or a synchronization signal, e.g., to enable other mobile tags 201 to properly initiate a ranging process. During the ranging period 522, the mobile tag 201 may be configured to perform ranging measurements using a first communications protocol, e.g., ultra-wideband signals, and/or to perform other techniques (e.g., RF signal strength indicator (RSSI)). During the listening period 524, the mobile tag 201 may be configured to monitor messages, e.g., including response messages, from other mobile tags 201 within its communication range using a suitable receiver, e.g., a Bluetooth and/or an ultra-wideband receiver. In at least some embodiments, the P2P sub-frame 520 may be periodic as shown in FIG. 12.

To detect the presence of the network 501 with anchors 204, the mobile tag 201 may be configured to monitor during the network sub-frame 528 for a beacon signal 510 generated by one or more anchors 204 in the network 501. During the network sub-frame 528, the mobile tag 201 may be configured to turn on the ultra-wideband receiver to monitor a beacon signal 510 generated by one or more anchor 204 using an ultra-wideband transmitter. Generally, a high resolution or ultra-wideband receiver of a mobile tag 201 may draw more current than a lower resolution or narrowband, e.g., Bluetooth, receiver. In at least some embodiments, e.g., to extend battery life of the mobile tag 201, the mobile tag 201 may be configured to maintain the ultra-wideband receiver on for a period 526 (depicted as Ts), which is less than the period (depicted as T) of the network sub-frame 528. The period 526 (Ts) may be chosen sufficiently large to enable the mobile tag 201 to detect a beacon signal of at least one network frame 509.

According to the example illustration of FIG. 12, a first instance of the beacon signal 510 may not be detected, because it occurs outside the period 526 (Ts) in which the ultra-wideband receiver of the mobile tag 201 is enabled to monitor for beacon signals. However, during a second instance of a super-frame 530, a beacon signal from a second instance of a network frame 509 may be detected during the period 526 (Ts) of the network-subframe 528 of the mobile tag 201. Upon detecting the beacon signal 510, the mobile tag 201 may be configured to extend the period 526 (Ts) to enable the mobile tag 201 to receive multiple instances of a beacon signal 510 which enables the mobile tag 201 to synchronize its clock to the network frame 509. Upon achieving synchronization, the mobile tag 201 may be configured to determine whether to transition from a peer-to-peer communications mode (as depicted in FIG. 12) to a network communications mode (as depicted in FIG. 11) is warranted.

In at least some embodiments, the mobile tag 201 may be configured to store a coverage map of the network 501. The coverage map may indicate areas in the network 501 in which access to anchors 204 may be available and not available. Alternatively or in combination with the foregoing embodiment, the mobile tag 201 may be configured to receive a message including a coverage map (or portion of the coverage map that represents a vicinity where the mobile tag 201 is located) from at least one anchor 204 after the mobile tag 201 has synchronized to the network frame 509. The mobile tag 201 may also be configured to track a history of its movements, e.g., from a time it left the network 501 to an open space 503 not inside the wireless coverage area of the network 501. The mobile tag 201 may performing this type of tracking by utilizing an accelerometer, gyroscope, and/or magnetometer (compass), e.g., according to inertial positioning techniques, to determine a history of positions from inside the network 501 to an open space 503 and back to the network 501. By tracking a history of positions, the mobile tag 201 may determine where it is in the coverage map of the network 501 and thereby determine whether it is in a communication range of one or more anchors 204 in the network 501. Alternatively, the mobile tag 201 may be configured to try to communicate with one or more anchors 204 and determine from ranging measurements whether it is located in the network 501. In yet another embodiment, the mobile tag 201 may receive messages from anchors 204 during CFP period and based on the number of messages and quality of messages received during CFP period determine if it is in the communication coverage of anchors 204 in the network 501.

Figure 13:
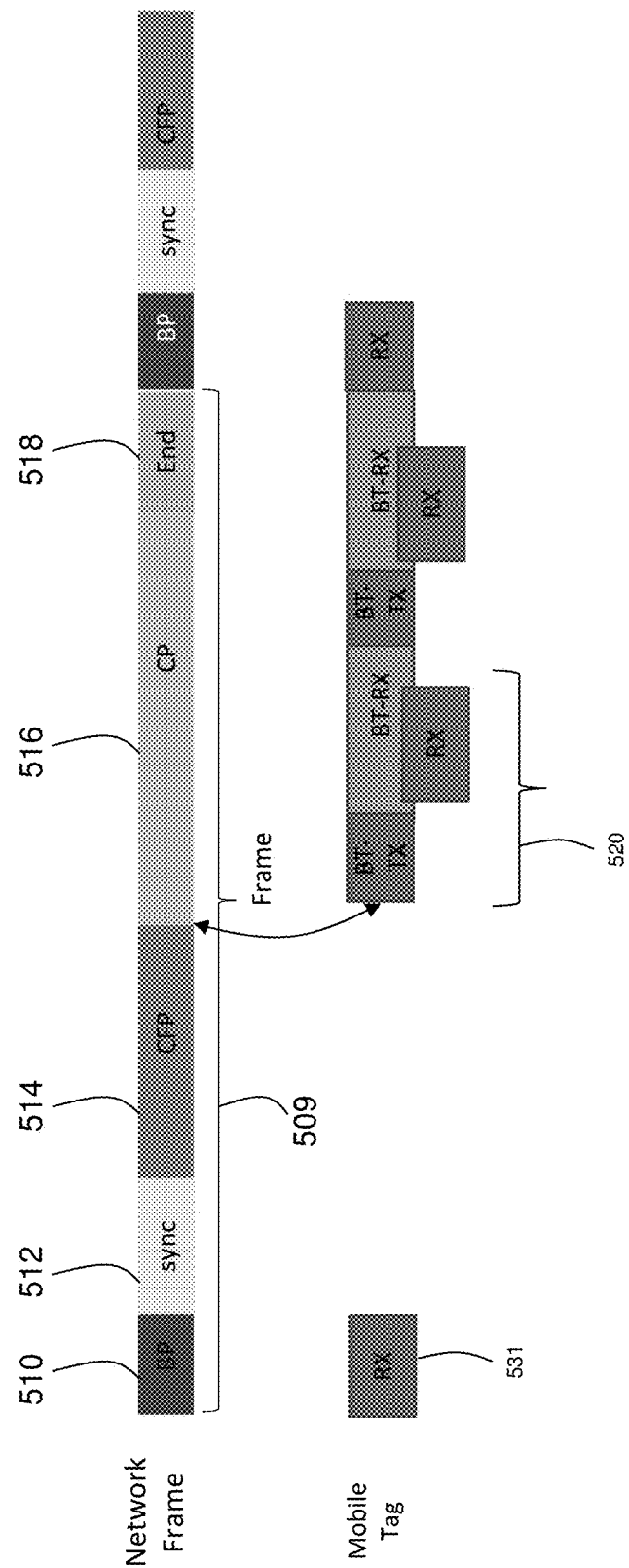
FIG. 13 is a block diagram illustrating an example, non-limiting embodiment of a mobile tag configured to utilize peer-to-peer communications in a manner that avoids interfering with portions of a network frame in accordance with various aspects described herein.

If the mobile tag 201 cannot reliably communicate with anchors 204 in the network 501, or cannot make an accurate measurement of its location relative to one or more anchors, and/or it determines from a coverage map and position history that it is an area of the network 501 where anchors 204 are not accessible, then the mobile tag 201 may be configured to adjust peer-to-peer mobile tag communications to occur in a position in a network frame 509 that minimizes chances of causing wireless signal interference with anchors 204 and/or other mobile tags 201 as may be engaged in a network communications mode as depicted in FIG. 13.

FIG. 13 is a block diagram illustrating an example, non-limiting embodiment of a mobile tag 201 configured to utilize peer-to-peer communications in a manner that avoids interfering with portions of a network frame 509 in accordance with various aspects described herein. To minimize RF interference with anchors 204 and/or other mobile tags 201 operating in a network communications mode, a mobile tag 201 that has insufficient coverage in the network 501 (e.g., cannot access one or more anchors 204) may be configured to maintain peer-to-peer communications in the CP 516 portion (i.e., contention period) of the network frame 509 and maintain synchronicity with the network frame 509 by monitoring the beacon signal 510 via a short listening period 531. Since the CP 516 portion allows for contentions (i.e., RF interference due to simultaneous RF transmissions), contentions caused by the mobile tag 201 performing peer-to-peer communications may be tolerated and will not cause issues with RF transmissions by anchors 204 utilizing the CFP portion 514 (contention-free period) of the network frame 509. The mobile tag 201 may perform this adjustment after it has synchronized its clock to the network frame 509 utilizing the beacon signal 510 as a reference signal. Once the mobile tag 201 has adapted peer-to-peer communications in the CP portion 516 of the network frame 509, the mobile tag 201 may cease to use timing associated with the P2P super-frame 530 depicted in FIG. 12, and instead resort to utilizing only the sub-frame 520 within the CP portion 516 of the network frame 509.

If, on the other hand, the mobile tag 201 determines that it is in the communication range of a sufficient number of anchors 204 in the network 501 to adequately determine its location in the network 501, then the mobile tag 201 may be configured to fully transition to a network communications mode by ceasing to utilize peer-to-peer communications altogether as depicted in FIG. 12 and rely exclusively on communications with anchors 204 utilizing the network frame 509 of FIG. 11.

Figure 14A:
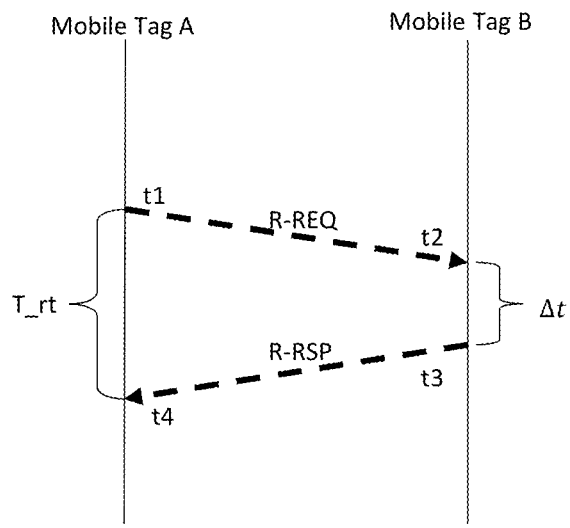
FIGS. 14A, 14B, 14C, 14D and 14E are block diagrams illustrating example, non-limiting embodiments of peer-to-peer communications for determining a location of a mobile tag in accordance with various aspects described herein.

FIGS. 14A-14D describe various embodiments for peer-to-peer communications that may be applied to the aforementioned embodiments described above. FIG. 14A depicts a two-way time of arrival (TW-TOA) peer-to-peer process for determining distances between mobile tags (mobile tag A and mobile tag B). The process may begin at mobile tag A, which transmits a range request (R-REQ) signal to mobile tag B at a first time $t_1$. Mobile tag B receives the R-REQ signal at a second time $t_2$. Mobile tag B processes the R-REQ signal for a period of $\Delta t$, and responsive thereto transmits a range response (R-RSP) signal at a third time $t_3$. Mobile tag A receives the R-RSP signal at a fourth time $t_4$. Mobile tag A may determine a roundtrip distance based on the example formula $d_{r\text{-}trip}=d_{AB}+d_{BA}$, where $d_{r\text{-}trip}$ represents a roundtrip distance, which is the sum of $d_{AB}$, the distance from mobile tag A to mobile tag B, and $d_{BA}$, the distance from mobile tag B to mobile tag A. The distance from mobile tag A to mobile tag B may be determined by $d_{AB}=c(t_2-t_1)$, where c is the speed of light. Similarly, the distance from mobile tag B to mobile tag A may be determined by $d_{BA}=c(t_4-t_3)$. Substituting the above equations, the roundtrip distance may be rewritten as $d_{r\text{-}trip}=c(t_4-t_3+t_2-t_1)$.

The time to process the R-REQ signal and to transmit the R-RSP signal via mobile tag B may be represented as $\Delta t=t_3-t_2$. Mobile tag B may be configured to transmit the value of $\Delta t$ in the R-RSP signal for use by mobile tag A in calculating $d_{r\text{-}trip}$. Substituting $\Delta t$ in $d_{r\text{-}trip}$ results in the formula: $d_{r\text{-}trip}=c(t_4-t_1-\Delta t)$. Since the values of $t_4$, $t_1$, and $\Delta t$ are known to mobile tag A, mobile tag A may readily calculate $d_{r\text{-}trip}$. Mobile tag A may also calculate the distance from mobile tag A to mobile tag B based on the formula: $d_{AB}=d_{r\text{-}trip}/2$. It will be appreciated that mobile tag A may also be configured to know a priori the fixed value of $\Delta t$.

In yet another embodiment, the processing time to receive the R-REQ signal and respond with the transmission of the R-RSP signal may be a fixed processing time interval known and used by all mobile tags performing TW-TOA analysis. In the foregoing embodiments, the value of $\Delta t$ would no longer need to be transmitted in the R-RSP signal. It will be further appreciated that the R-REQ and the R-RSP signals may be transmitted using ultra-wideband signaling technology to increase the accuracy of the $d_{r\text{-}trip}$ calculations or derivatives thereof. Accordingly, the TW-TOA illustrated in FIG. 14A may be used by either mobile tag A or mobile tag B to calculate a relative distance between each other. This process may be utilized in the embodiments that follow below.

Figure 14B:
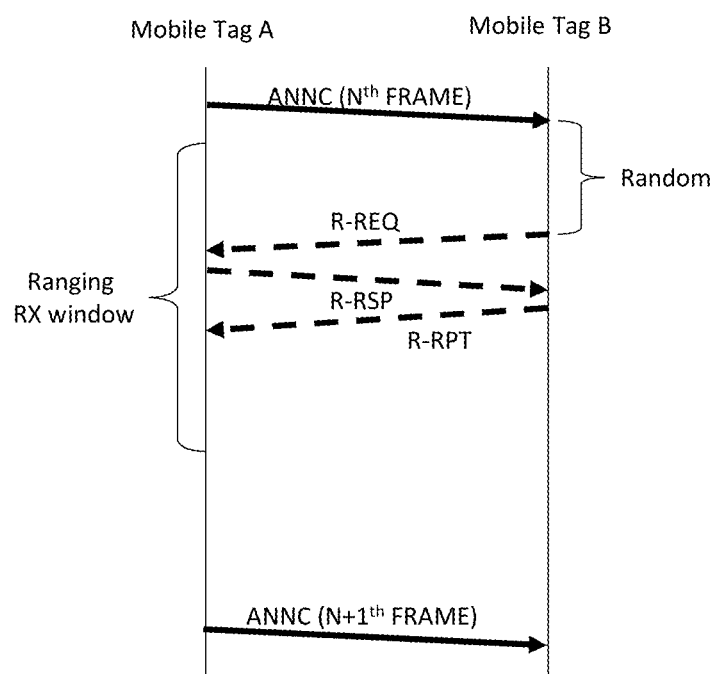

FIG. 14B depicts an example, non-limiting embodiment of a peer-to-peer process for determining location data between mobile tags in accordance with various aspects described herein. In FIG. 14B, Mobile tag A may begin by transmitting an announcement wireless signal (ANNC) utilizing a low power narrow band transmitter (such as a Bluetooth transmitter). Upon receiving at mobile tag B the announcement signal utilizing a narrow band receiver (e.g., Bluetooth receiver), mobile tag B may in response select a random time to transmit via a wideband transmitter a range request (R-REQ) signal utilizing a wideband signaling technology (e.g., ultra-wideband signal at high frequencies such as 500 MHz). Mobile tag A may be configured to turn on a wideband receiver (e.g., for receiving ultra-wideband signals) during a ranging RX window as shown in order to receive the R-REQ signal from mobile tag B and/or other mobile tags in a vicinity of mobile tag A that are responding to the announcement signal generated by mobile tag A.

Upon receiving the R-REQ signal, mobile tag A may be configured to enable a wideband transmitter (e.g., for transmitting ultra-wideband signals) to transmit a range response (R-RSP) signal. Mobile tag B may receive the R-RSP signal with a wideband receiver (e.g., for receiving ultra-wideband signals). Upon receiving the R-RSP signal, mobile tag B may determine the round-trip time between the R-REQ signal and the R-RSP signal and thereby determine a distance between mobile tag B and mobile tag A as described in relation to FIG. 14A. The R-RSP signal may include a processing time by mobile tag A to receive R-REQ and thereafter transmit R-RSP (Δt), or such time may be known to mobile tag B as previously described.

In addition to measuring a relative distance between mobile tags, mobile tag B (or mobile tag A) may be configured with multiple antennas to calculate an angle of arrival of the R-RSP signal based on a phase difference between the antennas. Such angle of arrival may be used to determine an angular orientation between mobile tag B and mobile tag A. By combining the angular orientation with a determination of the distance between mobile tags A and B, mobile tag B may also determine a location and angular orientation of mobile tag A relative to the location of mobile tag B.

Additionally, the announcement signal may be submitted periodically or asynchronously to prompt multiple measurements by mobile tag B (and other mobile tags in a vicinity for receiving the announcement signal) utilizing the process described in FIG. 14B. Distance and angular orientation may be used by mobile tag B (and other mobile tags) to also determine a trajectory of mobile tag A relative to mobile tag B (and vice-versa). Mobile tag B may also be configured to report to mobile tag A location information such as the measured distance, angular orientation, position, and/or trajectory of mobile tag A and/or B via a range report (R-RPT) signal. The R-RPT signal may be a narrow band signal (e.g., Bluetooth) or wideband signal (e.g., ultra-wideband). The trajectory data may be used to predict collisions between mobile tags A and B enabling each mobile tag to take mitigation action such as asserting an alarm at mobile tag B and/or mobile tag A.

Additionally, warning conditions may be provisioned at both mobile tags A and B to determine conformance with a required separation between mobile tags A and B. The warning conditions may be separation thresholds and/or trajectory thresholds. If the warning condition is not satisfied, mobile tags A and/or B may be configured to assert alarms. The alarms may be audible alarms, illuminating alarms (e.g., flashing colored light) or a combination thereof. Additionally, the embodiments depicted by FIG. 14B may be reversed in which mobile tag B is the one originating the announcement signal and mobile tag A calculates its location and/or orientation relative to mobile tag B as described above, and shares the same with mobile tag B.

Figure 14C:
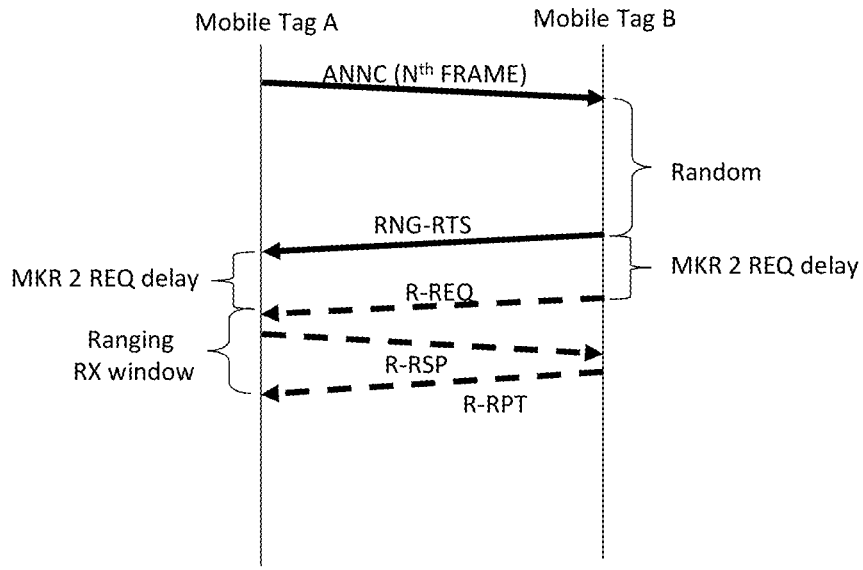

FIG. 14C depicts an adaptation to the embodiments of FIG. 14B. In particular, mobile tag B may be configured to transmit in response to the announcement signal a range ready-to-send (RNG-RTS) signal using narrow band signaling technology such as Bluetooth. The RNG-RTS signal may include timing information that indicates when mobile tag B will transmit the R-REQ signal. By knowing this timing, mobile tag A may substantially reduce the ranging RX window (which saves battery life of mobile tag A) by knowing the arrival time of the R-REQ signal and a predetermined time for receiving the R-RPT signal. If an R-RPT signal is not expected, mobile tag A may shorten the ranging RX window even further and thereby further improve battery life. The location and/or orientation measurements may be performed by mobile tag B as previously described in relation to FIG. 14B.

Figure 14D:
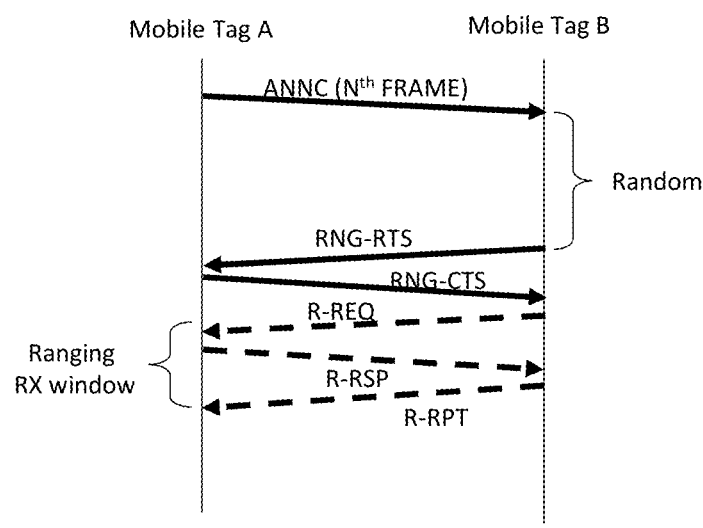

FIG. 14D depicts an adaptation to the embodiments of FIGS. 14B-14C. In this illustration, mobile tag A may be configured to transmit in response to the RNG-RTS signal a ranging clear-to-send (RNG-CTS) signal using narrow band signaling technology such as Bluetooth. The RNG-CTS signal may include timing information that indicates when mobile tag B should transmit the R-REQ signal. In this embodiment, mobile tag A may control the initial transmission time of the R-REQ signal thereby enabling mobile tag A to limit the size of the ranging RX window, reduce current draw from the ultra-wideband transceiver and thereby improve battery life of mobile tag A. The previously described embodiments of FIGS. 14B-14C are applicable to FIG. 14D for performing location and/or orientation measurements by mobile tag B and sharing such information with mobile tag A via the R-RPT signal.

Figure 14E:
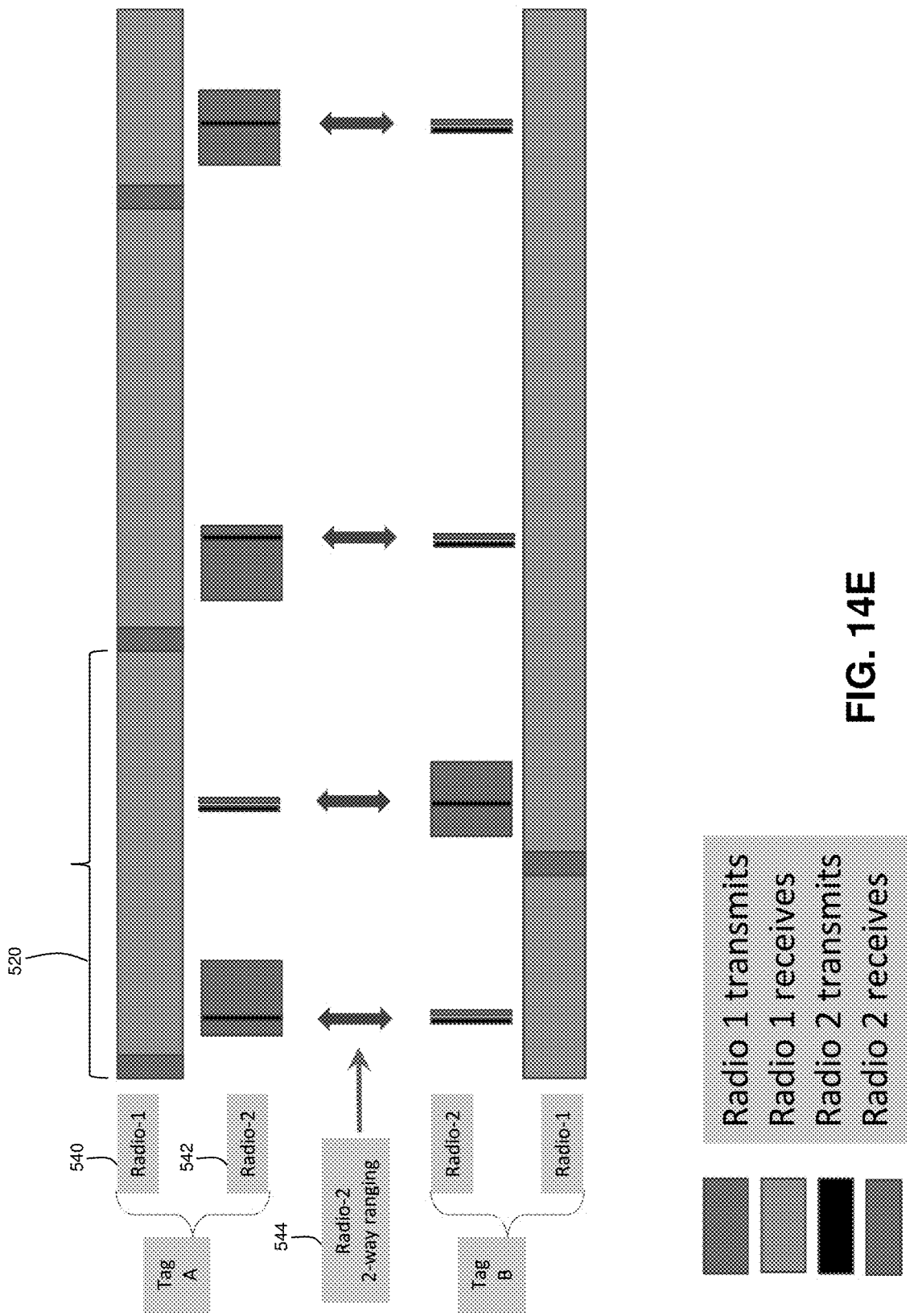

FIG. 14E temporally depicts illustrations of peer-to-peer communications between mobile tags based on transmission and reception intervals for achieving the embodiments described in relation to FIGS. 14A-14D. Each mobile tag may be equipped with at least two radios, e.g., radio-1 540 and radio-2 542. Radio-1 540 may be configured to transmit and/or receive narrow band, e.g., Bluetooth, signals, while radio-2 542 may be configured to transmit and/or receive wideband, e.g., ultra-wideband, signals. Since Bluetooth signals are narrow band signals, Bluetooth operations generally expend less power than ultra-wideband signals. Accordingly, utilizing a narrowband, e.g., Bluetooth, radio, when possible, may extend battery life of the mobile tags. FIG. 14E also depicts components of the P2P super-frame 530 previously describe in FIG. 12 for performing peer-to-peer range measurements 544. As described in FIG. 12, the P2P sub-frames 520 may be combined with the network sub-frame 528 to form a P2P super-frame 530, which enables a mobile tag 201 to perform peer-to-peer range measurements with other mobile tags 201, while monitoring for a presence of network anchors (not shown in FIG. 14E) that may trigger a process for transitioning a network communications mode as will be described further in process 600 of FIG. 17.

Figure 15:
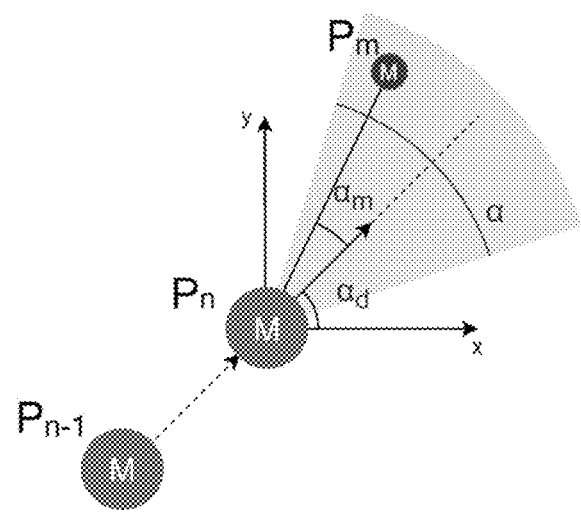
FIG. 15 is a block diagram illustrating an example, non-limiting embodiment of capabilities of a mobile tag to determine its location in a network of anchors providing location services in accordance with various aspects described herein.

FIG. 15 is a block diagram illustrating an example, non-limiting embodiment of capabilities of a mobile tag 201 to determine its location in a network of anchors providing location services in accordance with various aspects described herein. In the illustration of FIG. 15, a mobile tag 201 located in the network 501 of anchors 204 and operating in a network communications mode (i.e., exclusively performing ranging measurements with anchors 204) may determine its relative position to another mobile tag 201 and based on a history of positions ($P_{n-1}$ to $P_n$) its angular trajectory relative to the other mobile tag 201. Such angular trajectory may be used to assert alarms to avoid collisions, enforce social distancing, and/or other policies set by an administrator of the mobile tags 201 and/or network 501 of anchors 204.

Figure 16:
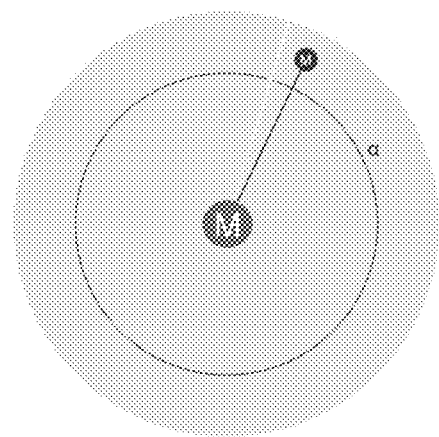
FIG. 16 is a block diagram illustrating an example, non-limiting embodiment of capabilities of a mobile tag to determine its location utilizing peer-to-peer communications with other mobile tags in accordance with various aspects described herein.

FIG. 16 is a block diagram illustrating an example, non-limiting embodiment of capabilities of a mobile tag 201 to determine its location utilizing peer-to-peer communications with other mobile tags 201 in accordance with various aspects described herein. In the illustration of FIG. 16, the mobile tag 201 may be limited to determining its relative location to another mobile tag 201 without trajectory information and/or angular orientation. In an alternative embodiment, the mobile tag 201 may perform one or more of the functions described in FIG. 15 with instrumentation such as one or more accelerometers, one or more gyroscopes, and/or a magnetometer. With such instrumentation, a mobile tag 201 may utilize as a reference point a last known location of the mobile tag 201 while in the network 501 of anchors 204 and determine thereafter utilizing the instrumentation a history of positions ($P_{n-1}$ to $P_n$) and its angular trajectory relative to another mobile tag 201 utilizing similar instrumentation.

Figure 17:
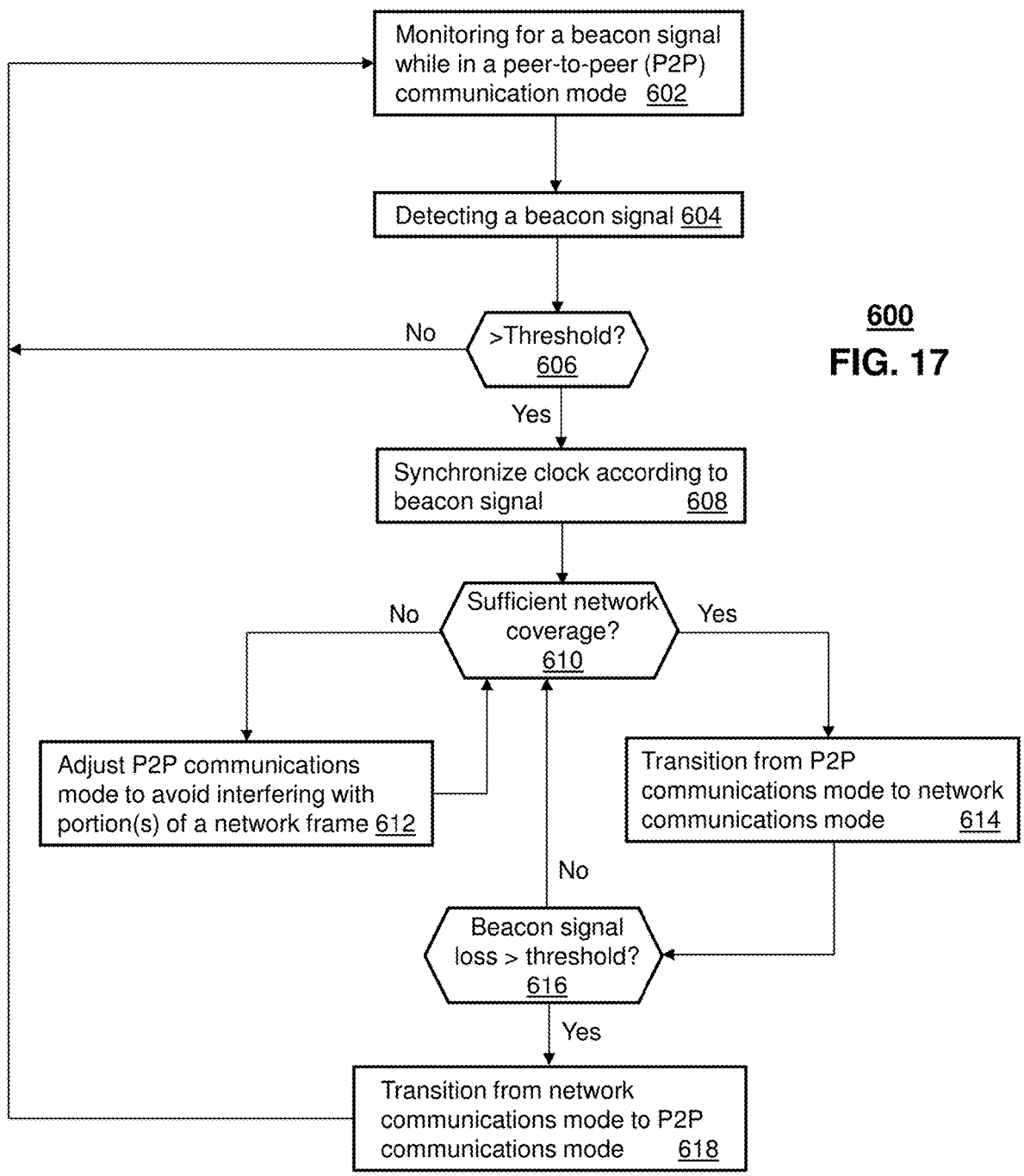
FIG. 17 depicts an illustrative embodiment of a method for transitioning between modes of communications; particularly, peer-to-peer communications mode and network communications mode in accordance with various aspects described herein.

FIG. 17 depicts an illustrative embodiment of a communication mode transitioning process 600 for transitioning between different modes of communications. According to the particular example, the process 600 is directed to transitioning between a peer-to-peer communications mode and a network communications mode in accordance with various aspects described herein. The communication mode transitioning process 600 may begin with step 602 in which a mobile tag may be configured to monitor a beacon signal while in a first communications mode, e.g., in a peer-to-peer communications mode, utilizing, e.g., the P2P super-frame 530 (and corresponding network sub-frame 528) shown in FIG. 12. As noted earlier, the peer-to-peer communication mode may be invoked when the mobile tag 201 transitions out of a coverage area of a network 501 of anchors 204 into an open space 503 and/or when the mobile tag 201 is located in the network 501 within an area that lacks sufficient coverage from the anchors 204, which causes the mobile tag 201 to resort to the embodiment described in relation to FIG. 13.

Upon detecting a beacon signal at step 604, while in a peer-to-peer communications mode, the mobile tag 201 may proceed to step 606 where it determines if a threshold of instances of a beacon signal has been satisfied (e.g., a threshold set to greater than some number of, e.g., two, consecutive beacon signals). If the threshold is not satisfied, the mobile tag 201 may be configured to return to step 602 and continue the monitoring process. If the threshold is satisfied, the mobile tag 201 may be configured at step 608 to synchronize its clock to the network frame 509 of FIG. 11, utilizing one or more instances of the beacon signal. In an embodiment, synchronization may take place during one or more instances of the synchronization period 512. Once synchronized, the mobile tag 201 may proceed to step 610 to determine if there is sufficient coverage in the network 501 to transition to a network communications mode (i.e., performing ranging measurements exclusively with the assistance of one or more anchors 204).

In one embodiment, the coverage determination of step 610 may be performed by the mobile tag 201 by comparing its location to a look-up table (or database) of sub-coverage areas in the network 501 (not shown in FIG. 10). If the mobile tag 201 has instrumentation to reasonably determine where it is located within the network 501, such location information may be sufficient for the mobile tag 201 to determine from a look-up table (or database) whether it is in an area of the network 501 where it has sufficient access to one or more anchors 204 to safely transition to a network communications mode, or whether it should transition to an adjusted peer-to-peer communications mode as depicted FIG. 13. The look-up table (or database) may be provided by one or more anchors at a previous time when the mobile tag 201 was located in the network 501 and operating in a network communications mode or from another source (e.g., mobile tag 201 paired with a communication device such as a smartphone that may communication with a server of the network 501 via a cellular network or other communication means). In another embodiment, the mobile tag 201 may be configured to receive one or more messages from one or more anchors 204 transmitting its location in the network 501, which the mobile tag 201 may then compare to the look-up table (or database) to determine if it is in a location that supports a safe transition to a network communications mode.

In another embodiment, the mobile tag 201 may receive one or more messages from one or more anchors 204 in the network 501 during the CFP period, which the mobile tag 201 may use to determine if it is able to transition to a network communications mode based on the number of messages and/or quality of the received messages from anchors 204 in the network 501 during the CFP period. For example, the quality of messages may be determined from a number of consecutive received messages exceeding a signal strength threshold. Such measurements may enable a mobile tag 201 to determine if there is sufficient (or insufficient) coverage in the network 501 of anchors 204 to transition from peer-to-peer communications to network communications or remain in peer-to-peer communications but operate in the mode shown in FIG. 13.

If the mobile tag 201 detects at step 610 that there is insufficient coverage in the network 501 relative to its current location to transition to a network communications mode, then the mobile tag 201 may proceed to step 612 where the mobile tag 201 may transition from a peer-to-peer communications mode as depicted in FIG. 12 to an adjusted peer-to-peer communications mode as shown in FIG. 13 (or maintain this adjusted communications mode if the mobile tag 201 had already previously implemented step 612). Alternatively, if the mobile tag 201 detects at step 610 that there is sufficient coverage to transition to a network communications mode, the mobile tag 201 may transition from a peer-to-peer communications mode as depicted in FIG. 12 to a network communications mode depicted by FIG. 11 where it performs ranging measurements exclusively with the assistance of anchors 204 of the network 501.

Once the transition from a peer-to-peer communications mode to a network communications mode occurs at step 614, the mobile tag 201 may be configured to monitor a lack of a presence of a beacon signal generated by the anchors 204 of the network 501. If the number of instances where the mobile tag 201 detects a lack of a beacon signal satisfies a threshold (greater than a threshold number of, e.g., two, consecutive lost beacon signals), the mobile tag 201 may transition to step 618 where it transitions from a network communications mode as depicted in FIG. 11 to a peer-to-peer communications mode as depicted by FIG. 12, and begins to monitor at step 602 for a presence of a beacon signal to transition back to the network communications mode once the instances of beacon signals satisfies the threshold of step 606 as previously described. If no lost beacon signals are detected at step 616, the mobile tag 201 may proceed to step 610 to determine if there's sufficient coverage to remain in the network communications mode at step 614. If the mobile tag 201 determines at step 616 that there is insufficient coverage, then the mobile tag 201 may proceed to step 612 and perform peer-to-peer communication as previously described above.

While for purposes of simplicity of explanation, the respective processes are shown and described as a series of blocks in FIG. 17, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figures 18, 19:
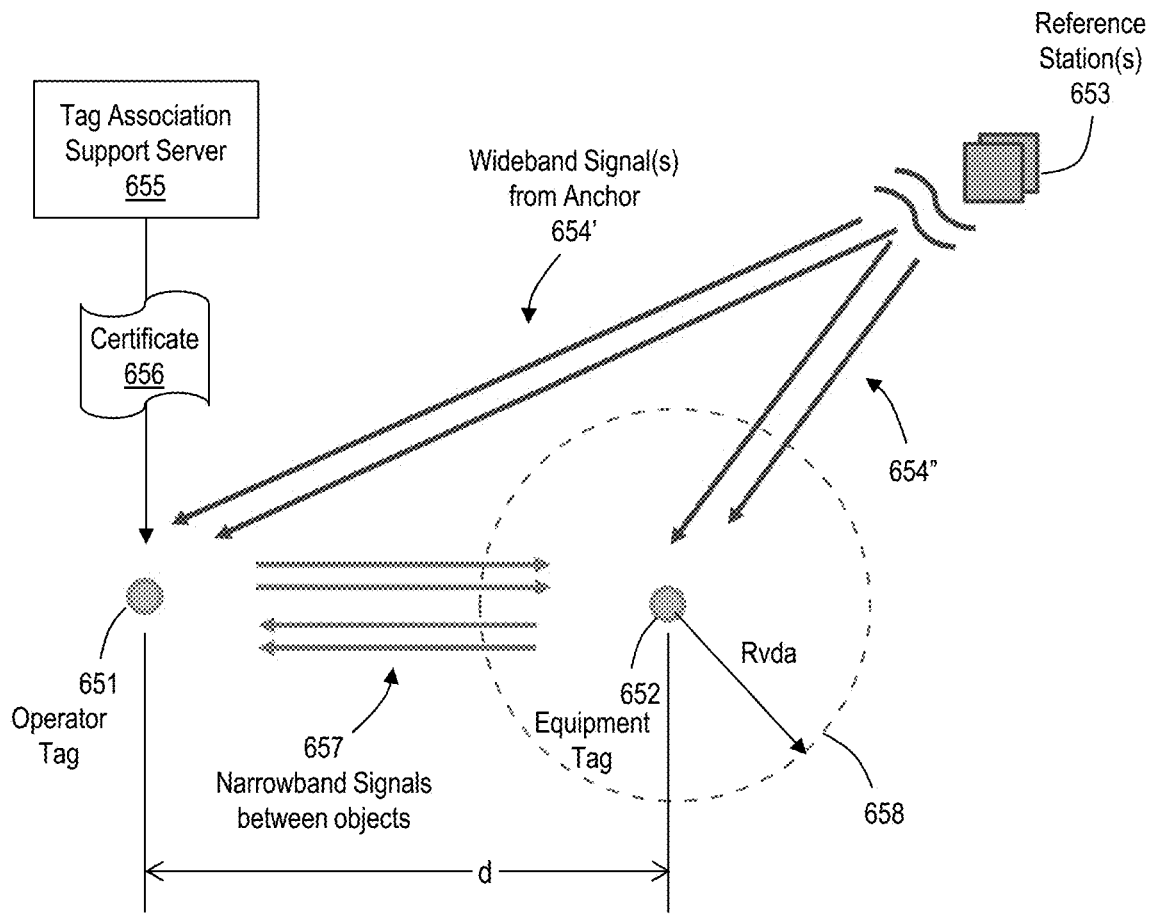
FIG. 18 is a block diagram of an example, non-limiting embodiment of a system using wireless tags to manage equipment-operator interactions in accordance with various aspects described herein.
FIG. 19 is a block diagram illustrating another example, non-limiting embodiment of a tag communication frame in accordance with various aspects described herein.

FIG. 18 is a block diagram of an example, non-limiting embodiment of an example system 650 using wireless tags to manage interactions among entities, such as equipment-operator interactions, in accordance with various aspects described herein. The example system 650 includes a first mobile device or tag 651, which may be a physical device at a first position and a second mobile device or tag 652 at a second position. The first and second mobile tags 651, 651 are separated by a distance, d. The tags 651, 652 may be adapted to participate in an entity interaction event, such as an association event between the tags 651, 652, and/or between objects to which the tags are attached and/or otherwise carried. For example, the first mobile tag 651 may be characterized as an operator tag 651, e.g., a mobile device adapted to be held, worn and/or otherwise carried by an operator entity. An operator entity may include, without limitation, an individual, a group of individuals, and/or a device, such as a machine and/or a computer. Non-human operators may include robots and/or other devices that may be operated under the control of another and/or autonomously, e.g., operating under the control of and/or with the assistance of pre-programming and/or artificial intelligence (AI).

The second mobile tag 652 may be characterized as an equipment tag 652, e.g., a mobile device adapted to be carried by, attached to and/or otherwise incorporated within an equipment entity. An equipment entity may include, without limitation, virtually any object, such as a vehicle, construction equipment, a machine, a tool, a container, e.g., a trailer, an electrical and/or electronic device, an architectural element. In at least some embodiments, the equipment may include a robot and/or other devices, e.g., drones, that may be operated under the control of another and/or autonomously, e.g., operating under the control of and/or with the assistance of pre-programming and/or artificial intelligence (AI).

The example system 650 also includes one or more reference entities, e.g., reference stations 653. According to the illustrative example, the reference station(s) 653 include a wireless transmitter and/or receiver and are spaced apart from either of the mobile tags 651, 652. It is understood that one or more of the mobile tags 651, 652 and/or the reference station(s) 653 may be adapted to communicate wirelessly with one or more of the other mobile tags 651, 652 and/or the reference station(s) 653. In at least some embodiments, the reference station(s) 653 may communication with one or more of the mobile tags 651, 652 according to a first wireless technology. According to the illustrative embodiment, the first wireless technology is a wideband technology, e.g., facilitating an exchange of wideband wireless signals 654', 654", generally 654, with one or more of the other mobile tags 651, 652. Wideband may refer to operation at a relatively high frequency. In this example, the reference station(s) 653 communicate with the operator mobile tag 651 via a first wideband wireless signal 654' and with the equipment mobile tag 652 via a second wideband wireless signal 654". Communications may include one or more of receiving wireless signals and transmitting wireless signals.

In at least some embodiments, one or more of the reference station(s) may include an anchor device positioned at a predetermined and/or otherwise known location, while one or more of the other mobile tags 651, 652 may be mobile. The wideband wireless signals 654 may facilitate determination of location(s) of one or more of the operator mobile tag 651 and/or the equipment mobile tag 652, e.g., according to any combination of the various techniques disclosed herein and/or otherwise known to those skilled in the art. It is conceivable that in at least some embodiments one or more of the reference station(s) 653, may include an operator mobile tag 651 and/or an equipment mobile tag 652 adapted to relay wideband wireless signals from an anchor device and/or to otherwise serve as an anchor device having a predetermined location.

In at least some embodiments, one or more of the mobile tags 651, 652 and/or the reference station(s) 653 may be adapted to communicate wirelessly with one or more of the other mobile tags 651, 652 and/or the reference station(s) 653 according to a second wireless technology. According to the illustrative embodiment, the second wireless technology is a narrowband technology, e.g., facilitating an exchange of narrowband wireless signals 657 with one or more of the reference station(s) 653 and/or the other mobile tags 651, 652 at a relatively low frequency. One or more of the wideband wireless signals 654 and the narrowband wireless signals 657 may be used to determine a location of one or more of the mobile tags 651, 652. Alternatively or in addition, one or more of the wideband wireless signals 654 and the narrowband wireless signals 657 may be used to exchange information related to one or more of the mobile tags 651, 652, such as in support of an association of one or more of the mobile tags 651, 652 with another entity, such as another mobile tag 651, 652. Without restriction the wideband and narrowband wireless signals 654, 657 may include any suitable wireless technology, such as those employing any combination of radio frequency signals, optical signals, audio signals including ultrasonic signals, and the like.

The example system 650 also includes a tag association support server 655. The support server 655 may provide supporting information to one or more of the mobile tags 651, 652 to facilitate tag-related activities, such as associations of the tags 651. Supporting information may include, without limitation, one or more of a role of a mobile tag 651, 652, an identity of an object to which the mobile tag is attached, worn and/or held, a certification and/or qualification of an objection, a certification and/or qualification requirement of the object, and so on. It is worth noting that although the operator and equipment tags 651, 652 are described as being mobile tags, it is envisioned that at least one tag adapted to participate in an operator-equipment association may be stationary. For example, the equipment may be stationary, as in a manufacturing tool fixedly located within a manufacturing facility.

In at least some embodiments, the tag association support server 655 may include one or more of a certification server and/or certificate authority and/or issuer. The tag association support server 655 may provide supporting information, such as configuration information and/or certification information 656 to the operator mobile tag 651. In some embodiments, the certification information 656 may be provided during a tag configuration process in which the operator mobile tag 651 is proximate to the tag association support server 655. Alternatively or in addition, the certification information 656 may be provided to the operator mobile tag 651 remotely via a communications channel. Without restriction, the communications channel may utilize one or more of the wideband signal technology, the narrowband signal technology, or some other wireless signal technology. It is conceivable that in at least some instances, the certification information 656 may be provided to the operator mobile tag 651 via a wired technology, such as a mobile cellular network, a LAN, a WAN, e.g., the Internet, and the like. Although not illustrated in the example system 650, it is understood that the tag association support server 655 may exchange one or more of an identity, role, certification, qualification and/or authorization requirements with other entities, such as the reference station(s) 653 and/or the equipment mobile tag 652, according to any of the example information exchanging techniques provided herein and/or otherwise known to those skilled in the art.

In at least some embodiments, the operator mobile tag 651 may locally store configuration information, including one or more of a role, an identity, a certification and/or qualification of the operator mobile tag 651 and/or of an operator in authorized and/or otherwise in possession of the operator mobile tag 651. Alternatively or in addition, the equipment mobile tag 652 may locally store configuration information including one or more of a role, an identity, a certification and/or qualification and/or authorization requirement of the equipment mobile tag 652 and/or of equipment to which the equipment mobile tag 652 is attached. Without limitation, configuration information may include one or more of a distance, a position, and/or an orientation requirement as may be used in determining tag associations. According to the illustrative example, the equipment mobile tag 652 may store a distance value, such as a maximum range 658, $R_{vda}$, at which an operator-equipment, e.g., a vehicle-driver, association may be determined.

It is envisioned that one or more of the operator tag 651, the equipment tag 652 and/or a tag association support server 655 may monitor locations, positions and/or orientations of one or more of the mobile tags 651, 652. A separation distance, d, may be determined by the monitoring device and compared to an association-range threshold. When the separation distance is less than the applicable range threshold, one or more of the mobile tags 651, 652 and/or the tag association support server 655 may compare one or more of an identity, a certificate and/or a qualification of the operator to an identity requirement, a certification and/or qualification and/or authorization requirement of the equipment mobile tag 652. An association may be declared and/or otherwise determined according to a match. It is understood that the equipment may be adapted to permit and/or inhibit one or more of access and/or operation of the equipment based on the presence or absence of an operator-equipment association, e.g., as determined by one or more of the mobile tags 651, 652 and/or the support server 655, and/or the reference station(s) 653. In at least some embodiments, an alarm may be activated upon an unsuccessful match.

The example certificate 656 may include a configurable parameter of the operator, the equipment and/or a possible association between the operator and the equipment. In some embodiments, one or more of the identity requirement, the certification, qualification and/or authorization requirement of the equipment may not be provided and/or provided with a value signifying that no instructions are imposed based on the requirement. For example, if such requirements are not required for a vehicle equipment, the vehicle may be driven by any driver. Similarly, one or more of the configurable values, e.g., requirements, may be defined to permit control of the equipment by a limited number of operators. For example, the equipment may be configured with a certificate, such that an operator-equipment association is created only if requirements of certificate are met.

Certifications and/or qualifications may relate to one or more of an operator's training status, age, identity, operator class. Alternatively or in addition, certifications and/or qualifications may depend at least in part on one or more of active hours and/or duration of operation, e.g., shifts, periods of rest since last active equipment operation and/or association, etc. The identities, certifications and/or qualifications may be exchanged between one or more of the mobile tags 651 vial the narrowband wireless signals 657 according to digital documents. The digital documents may include attributes associated to the holder, e.g., by an authorized issuer and/or certification authority. Accordingly, a certificate may be issued by an attribute authority and may be used to characterize and/or entitle its holder to access and/or operate equipment. In at least some embodiments, such attribute information may be changed frequently and/or have a relatively short validity time according to different security rigors, validity times and/or other issuers as may be appropriate.

FIG. 19 is a block diagram illustrating an example, non-limiting embodiment of a tag communication frame 660 in accordance with various aspects described herein. The tag communication frame 660 may be adapted for exchanging configuration information, e.g., as may be used in configuring and/or reconfiguring of a mobile tag. Alternatively or in addition, tag communication frame 660 may be adapted for exchanging configured information from a configured mobile tag to another entity, such as another tag and/or an anchor and/or a backend server.

The tag communication frame 660 may include one or more fields corresponding to one or more configuration parameters. According to the illustrative example, the tag communication frame 660 includes an object identification and/or object type fields 661. The example frame 660 may include one or more other certificate fields corresponding to certification information. The one or more certificate fields 662 may include certification(s) and/or qualification(s) of an operator for an operator mobile tag. Likewise, the one or more certificate fields 662 may include certification and/or qualification requirements as may be necessary to access and/or operate equipment of an equipment mobile tag.

In at least some embodiments the communication frame 660 may include one or more supplemental information fields, e.g., including information related to one or more of the other fields, such as the object identification and/or type field 661 and/or the certification and/or qualification field(s) 662. Supplemental information may include time values, e.g., duration and/or expiration of a certificate and/or qualification and/or a rank of an operator mobile tag and/or an equipment category, make, model, restriction, and the like of an equipment mobile tag. It is further envisioned that in at least some embodiments, the tag communication frame 660 may include one or more other fields 664 that may contain other information that may be related to one or more of the object type, identity, certification, qualification. Alternatively or in addition, the other fields may be unrelated to the object and/or any of the other object and/or certification and/or qualification requirement fields 661, 662, 663.

In at least some embodiments, one or more of the fields 661, 662, 663, 664 may be encrypted, hashed and/or otherwise scrambled to obfuscate the underlying information and/or to prohibit unauthorized generation and/or modification of such information. For example, an operator tag may receive and/or store operator identity and/or certification and/or qualification information in an encrypted state, without having access to any means for decryption, such as an encryption/decryption key. The decryption kay may be generated and/or provided separately to an equipment tag to permit evaluation of operator information received by the equipment mobile tag. Receipt of suitably protected and/or encrypted information may provide assurance to the equipment tag that the operator identity, certification and/or qualifications have not been tampered with. Encryption may include any technique generally known to those skilled in the art including public key encryption.

It is understood that the illustrated arrangement of the fields 661, 662, 663, 664 of the example communication frame 660 may be arranged in any manner, e.g., interlaced and/or interspersed within the same communication frame 660 and/or separated according to separate frames 660 or messages. Alternatively or in addition, the communication frame 660 may be adapted to one or more other communication protocols and/or error detection and/or correction techniques.

Figure 20:
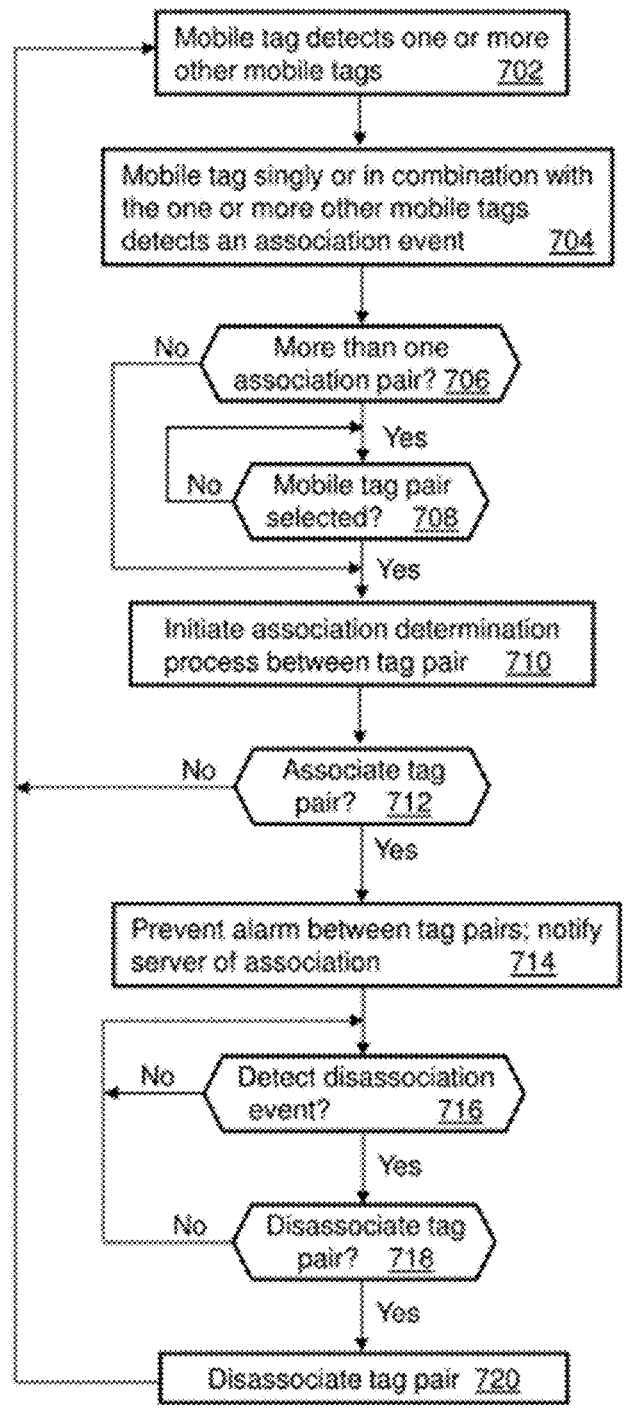
FIG. 20 depicts an illustrative embodiment of a process for determining whether to associate or disassociate mobile tags in accordance with various aspects described herein.

FIG. 20 depicts an illustrative embodiment of a process 700 for determining whether to associate or disassociate mobile tags in accordance with various aspects described herein. The process 700 may be applied to the environment of the mobile tags 201 shown in FIGS. 7, 18 and 21A-21C. For instance, a mobile tag 201 may be coupled to a piece of equipment, such as a vehicle (e.g., a forklift) that may be controlled by a user or operator who also carries a mobile tag 201. The process 700 may also be utilized to distinguish a mitigation event such as described in the process 300 at step 312 (e.g., collision avoidance) from an association event as will be described further below. The process 700 also provides a process for identifying a disassociation event for disassociating mobile tags 201 that were previously associated with each other.

It will be appreciated that the process 700 is not limited to the use cases of FIGS. 7 and 21A-21C. The process 700 may be applied to other use cases, including without limitation, a parking lot for managing parking spots (e.g., valet service), a commercial or retail environment for monitoring individuals and/or assets (e.g., individuals tasked to distribute assets by hand or other equipment), assisted navigation of vehicles and/or machinery such as robots or forklifts (e.g., use or maintenance of machinery), as well as other suitable applications for which the subject disclosure can be applied to.

Figure 21A:
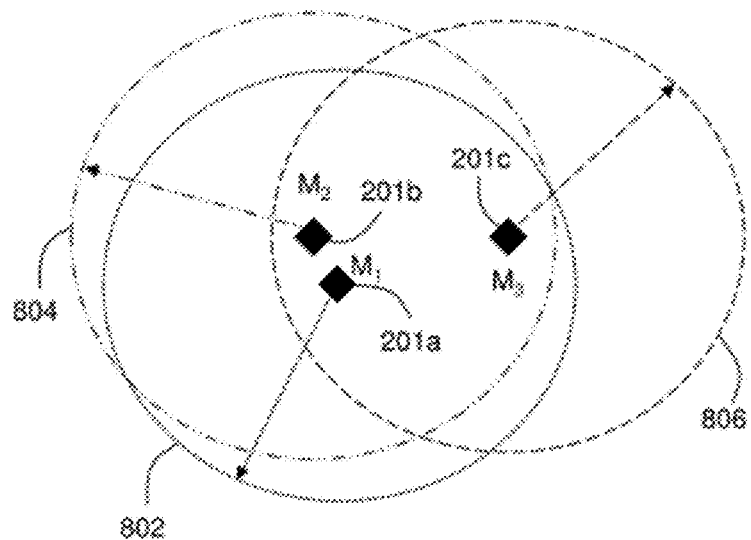
FIGS. 21A, 21B and 21C are block diagrams illustrating exemplary, non-limiting embodiments of use cases for associating and/or disassociating mobile tags in accordance with various aspects described herein.

With this in mind, the process 700 may begin at step 702 in which mobile tags 201a-201c detect each other in their respective coverage areas 802, 804, 806 as depicted in FIG. 21A (e.g., mobile tags M1, M2, M3). As noted in step 308 of FIG. 8, mobile tags 201 may be configured to share location information with a server, anchors and/or each other. At step 702, the mobile tags 201a-201c may be further configured to share each other's locations. Sharing location information among mobile tags 201a-201c enables the mobile tags 201a-201c to determine their respective distances among each other, their respective movement among each other, and/or their respective trajectories among each other, any or all of which may be used by one or more of the mobile tags 201a-201c to distinguish an association event at step 704 from a mitigation event (such as a collision).

In another embodiment, the mobile tags 201a-201c may also be configured to exchange messages indicating the use case for these mobile tags 201a-201c. For example, a first mobile tag may be associated with an operator and referred to herein as an operator mobile tag 201a. The operator mobile tag 201a may be configured to send a message to the other mobile tags that may be associated with equipment and referred to herein as equipment mobile tags 201b-201c, e.g., indicating that it is a mobile tag being carried by an individual, e.g., an operator, while equipment mobile tags 201b-201c may send messages to each other and/or the operator mobile tag 201a indicating that equipment mobile tags 201b-201c are equipment tags being carried by, attached to and/or otherwise associated with pieces of equipment, e.g., a vehicle, such as a forklift, which may be operated, e.g., driven, by the operator carrying the operator mobile tag 201a for asset placement and relocation in the demarcated area 200 of FIG. 7.

The exchange of messages between mobile tags 201a-201c may further indicate an identity of the individual operator carrying the operator mobile tag 201a, a status of the equipment mobile tags 201b-201c such as, for example, whether the equipment, e.g., vehicles, respectively, coupled to equipment mobile tags 201b-201c are available for use. As a precautionary measure, the equipment mobile tags 201b-201c may be further configured to communicate with another entity, such as a server (discussed in relation to FIGS. 7-8), e.g., via a wireless access terminal, such as a gateway anchor 208 to determine whether the individual identified by operator mobile tag 201a is authorized and/or certified to use the equipment, e.g., vehicles, coupled to the equipment mobile tags 201b-201c, respectively. Upon receiving confirmation that the individual is authorized and/or certified, for example, to utilize either vehicle coupled to the equipment mobile tags 201b-201c, the equipment mobile tags 201b-201c may be configured to send a message to the operator mobile tag 201a indicating the individual is authorized to use such vehicles. If the individual carrying the operator mobile tag 201a is not authorized to use either vehicle, the equipment mobile tags 201b-201c may be configured to send a message to the operator mobile tag 201a indicating this determination. It will be appreciated that, alternatively or in addition, the equipment mobile tags 201b-201c may be configured with look-up tables, respectively, to track authorized users of each piece of equipment, e.g., vehicle, and perform the foregoing verification without communicating with the server.

To the extent the above exchange of messages between the mobile tags 201a-201c is not directly related to TDOA and/or TW-TOA measurements, the mobile tags 201a-201c may be configured to utilize narrowband signaling technology (e.g., Bluetooth®) to perform such communications and to conserve more power than utilizing wideband signaling technology.

Based on the above information, the mobile tags 201a-201c may be configured to detect, at step 704, an association event versus a mitigation event. An association event may be based on a certification event, e.g., according to a determined certification match, and/or an association event, e.g., based on verification of operator certification. In the case of a mitigation event, the mobile tags 201a-201c may be configured to determine whether they are in motion or stationary. To the extent the mobile tags 201a-201c are in motion, they may determine whether such movements might result in a collision based on respective trajectories of one or more of the mobile tags 201a-201c. If, on the other hand, the operator mobile tag 201a detects that one or both of the equipment mobile tags 201b-201c are not in motion (e.g., stationary) and/or that the equipment mobile tags 201b-201c have indicated by wireless messages that their respective equipment, e.g., vehicles, are available for use, then the equipment mobile tags 201a-201c may be configured to detect an association event is present at step 704 rather than a mitigation event.

For illustration purposes only, assume that the equipment mobile tags 201b-201c are both coupled to equipment, e.g., vehicles, that are available for use by the individual carrying the operator mobile tag 201a. In this use case, the equipment mobile tags 201a-201c may be configured to detect this condition at step 706 based on an exchange of one or more of the messages described above and/or motion tracking by the mobile tags 201a-201c. Since both vehicles are available for use by the individual, the individual must be made aware that both vehicles are available for use. To achieve this notification, the association event detected at step 704 in association with both vehicles can be communicated to the individual visually and/or audibly at step 706. For example, the mobile tags 201a-201c may be configured with and/or otherwise associated with a user interface, e.g., the user interface 904 depicted in FIG. 23. The user interface 904 may be configured to illuminate an LED of the visual or presentation device 910 of the mobile tags 201a-201c and strobe a color of light indicating an association event (e.g., strobing the color yellow). The strobing rate of the mobile tags 201a-201c may begin at a same frequency (e.g., 2 Hz) to indicate to the individual carrying operator mobile tag 201a of the possible association options with the vehicles of the equipment mobile tags 201b-201c.

To select an association, the individual may utilize a button of the input device 908 of the operator mobile tag 201a to select between the vehicles of the equipment mobile tags 201b-201c, respectively. For example, the individual may depress twice the button of the input device 908 of the operator mobile tag 201a to identify an interest in associating with one of the vehicles of the equipment mobile tags 201b-201c. This depression may be conveyed to mobile tags 201b-201c via wireless messages. In at least some embodiments, the association may be facilitated using a proximity control and/or restriction, e.g., a Near Field Communications (NFC) protocol. For example, the tag might communicate with an object, e.g., the vehicle, only when positioned within a certain range or distance from the object and/or area around the object, e.g., 3-10 cm away from the vehicle's access portal, and/or operator controls. Such proximity features and/or restrictions may avoid complexity in making a vehicle selection, thereby expediting regular operations. Upon receiving a wireless message from the operator mobile tag 201a, the first equipment mobile tag 201b may increase the strobe the LED to a faster rate (e.g., 5 Hz), while the LED of the second equipment mobile tag 201c strobes its LED at a lower rate (e.g., 2 Hz). Repeating the double depression of the button of the operator mobile tag 201a results in the operator mobile tag 201a transmitting a new wireless message that causes the second equipment mobile tag 201c to strobe its LED faster (e.g., 5 Hz), while the first equipment mobile tag 201b strobes its LED at a lower rate (e.g., 2 Hz). The faster strobing of the LED of the first equipment mobile tag 201b may indicate to the individual of the operator mobile tag 201a that the vehicle associated with the first equipment mobile tag 201b is ready to be associated with the operator mobile tag 201a of the individual, while the second equipment mobile tag 201c with the slower strobe rate of its LED indicates to the individual the vehicle associated with second equipment mobile tag 201c is on standby for an association.

Figure 21B:
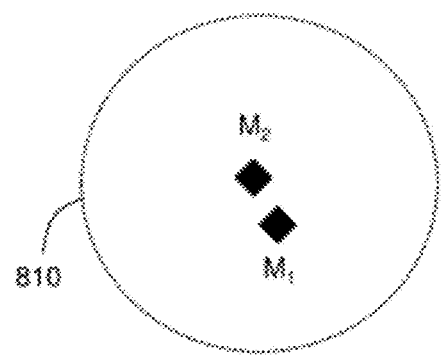

It will be appreciated that the transmission of a message by the operator mobile tag 201a that causes the toggling effect described above between the equipment mobile tags 201b-201c may be performed by other user-generated input provided by the individual (e.g., speech detected by a microphone of audio system 912 of mobile tag 201a). Alternatively, the equipment mobile tags 201b-201c may be configured to detect speech of the individual via a microphone of the audio system 912 of the equipment mobile tags 201b, 201c, and perform the toggling effect described above without needing to receive a wireless message from the operator mobile tag 201a of the individual. It will be further appreciated that one of the equipment mobile tags 201b-201c may be configured to automatically strobe its LED at the higher rate (e.g., 5 Hz) based on which of the equipment mobile tags 201b-201c is closest to the operator mobile tag 201a carried by the individual (e.g., mobile tags 201a-201b as depicted in FIGS. 21A-21B). Alternatively or in addition, the equipment mobile tags 201b-201c may be configured to inform each other, e.g., via a wireless message exchange, as to which of the equipment mobile tags 201b-201c has determined it is closest to mobile tag 201a.

The individual carrying the operator mobile tag 201a may select an association to one of the equipment mobile tags 201b-201c by utilizing a different button depression technique (e.g., depress button continuously for 2.5 seconds). For instance, suppose the individual carrying the operator mobile tag 201a chooses to select the vehicle coupled to the first equipment mobile tag 201b. Upon depressing the button of the operator mobile tag 201a continuously for about 2.5 seconds, the operator mobile tag 201a may transmit a wireless message to the first equipment mobile tag 201b to initiate at step 710 an association determination process, e.g., by changing the LED illumination from a strobing illumination to a continuous color (e.g., light green). Similarly, the LED of the operator mobile tag 201a may also be illuminated to the same continuous color at step 710. These actions at step 710 may indicate to the individual that an association has been initiated between the operator mobile tag 201a of the individual and the first equipment mobile tag 201b, e.g., of the first vehicle. It will be appreciated that in at least some embodiments, the equipment mobile tags 201b-201c may be configured to automatically change the LED illumination from a strobing illumination to a continuous color (e.g., light green) upon detecting that the equipment mobile tags 201b-201c are in close proximity to each other or crossed a distance threshold (e.g., a threshold of about 1 meter from each other).

Upon the individual turning on the first vehicle carrying the first equipment mobile tag 201b via an ignition key, the LED of the first equipment mobile tag 201b may change to a different color, e.g., a brighter and darker green color. The first equipment mobile tag 201b may be configured to communicate the change in the LED illumination to the operator mobile tag 201a via a wireless message, thereby causing the operator mobile tag 201a to perform the same change with its LED illumination. This ends the example association determination process at step 710 for the mobile tags 201*a*-201*b* and enables the mobile tags 201*a*-201*b* to identify an association state at step 712. This also provides other individuals roaming the demarcated area 200 of FIG. 7, with an indication of an association between the individual carrying the operator mobile tag 201*a* and the first vehicle carrying the first equipment mobile tag 201*b*. To prevent a false alarm assertion, the mobile tags 201*a*-201*b* may be configured at step 714 to disable an alarm state (e.g., audible, visual and/or tactile alarm) from being asserted based on the close proximity of mobile tags 201*a*-201*b* to each other. Although such alarm conditions may be disabled between mobile tags 201*a*-201*b* while they are collocated and associated with each other, the mobile tags 201*a*-201*b* may be configured to continue monitoring the location of other mobile tags 201 to determine if a mitigation event has occurred, e.g., as described by step 312 of FIG. 8, and assert an alarm when a mitigation event is detected (e.g., potential collision).

Alternatively or in addition, the operator mobile tag 201*a* and/or the first equipment mobile tag 201*b* may be configured at step 714 to inform the second equipment mobile tag 201*c* and/or the server (e.g., via a gateway anchor 208) of this association via a wireless message transmitted by the operator mobile tag 201*a* and/or the associated first equipment mobile tag 201*b*. Alternatively, the second equipment mobile tag 201*c* may be configured to assert a timer when the association event was detected at step 704 having a duration of, for example, two minutes. After the timer expires and/or the second equipment mobile tag 201*c* receives a wireless message from the operator mobile tag 201*a* and/or the first equipment mobile tag 201*b* of the association, the second equipment mobile tag 201*c* may, in turn, disable the illumination of its LED to indicate to other individuals roaming the demarcated area 200 of FIG. 7, that the second vehicle associated with the second equipment mobile tag 201*c* is available for use.

The server may over time association information from mobile tags 201 performing the above process to monitor individuals utilizing vehicles in the demarcated area 200 of FIG. 7.

Figure 21C:
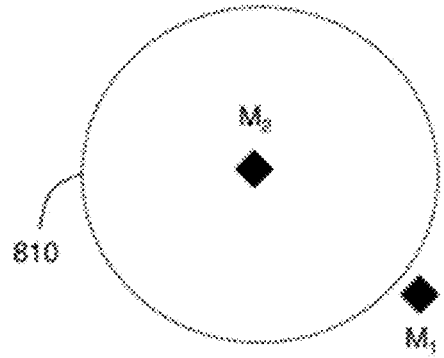

Once the mobile tags 201*a*-201*b* have been associated, one or both of the associated mobile tags 201*a*-201*b* may be configured at step 716 to establish a perimeter 810, e.g., as depicted in FIGS. 21B and 21C to detect a disassociation event. At step 716, the mobile tags 201*a*-201*b* may be further configured to periodically monitor their respective locations, e.g., utilizing the TDOA and/or TW-TOA measurement techniques described earlier and share the location information with each other via an exchange of wireless messages. The perimeter 810 may serve as a distance threshold (e.g., three meters) from which the mobile tags 201*a*-201*b* may operate without invoking a disassociation event. A disassociation event may represent a circumstance in which association of the mobile tags 201*a*-201*b* may no longer desirable and/or allowable. In at least some embodiments, a disassociation event may be based on a change in an operator's certification status and or a change in an operator's qualification status of an operator mobile tag. Alternatively or in addition, a disassociation event may be based upon a duration of time and/or a location of the operator and/or the equipment. For example, if the individual carrying the operator mobile tag 201*a* is no longer controlling or occupying the first vehicle associated with the first equipment mobile tag 201*b*, because the individual has decided to initiate a lunch break that is too far removed from the vehicle, then the mobile tags 201*a*-201*b* may be configured to detect this change in circumstances due to the mobile tag 201*a* of the individual leaving the perimeter 810 as shown in FIG. 21C. Upon detecting a distance between the associated mobile tags 201*a*-201*b* that exceeds the perimeter 810, one or both of the associated mobile tags 201*a*-201*b* may be configured to initiate a disassociation determination process. The disassociation determination process may lead to a disassociation of the associated mobile tags 201*a*-201*b*, which in turn, may enable other individuals with other operator mobile tags 201 to make use of the equipment, e.g., the vehicle associated with the disassociated first equipment mobile tag 201*b*; thus, increasing the overall efficiency of equipment usage in the demarcated area 200 of FIG. 7.

Alternatively or in addition, the above association processes may be used to prevent unauthorized users from making use of the first vehicle associated with the first equipment mobile tags 201*b* at the consent of the individual of the operator mobile tag 201*a*. For example, once the mobile tags 201*a*-201*b* have been associated with each other, another user with a different operator mobile tag (e.g., operator mobile tag 201*d*, not shown) cannot take control of the first vehicle associated with the first equipment mobile tag 201*b*, because once the distance between the first operator mobile tag 201*a* exceeds the perimeter 810, a disassociation determination process may be invoked, which may lead to a disassociation between the formerly associated mobile tags 201*a*-201*b*. When such a disassociation occurs between the formerly associated mobile tags 201*a*-201*b*, the association process started at step 702 that leads to the association determination process at step 710 must be reinitiated, which as described earlier will not allow associations between unauthorized users and the vehicle. The association and disassociation process may also prevent the individual carrying the first operator mobile tag 201*a* from associating him/herself with more than one piece of equipment, e.g., vehicle, at a time, thereby preventing an excess logging of vehicle time usage.

Referring back to step 716, the associated mobile tags 201*a*-201*b* may be configured to detect when the operator mobile tag 201*a* is outside the distance threshold associated with perimeter 810. This determination may be performed by one or both of the mobile tags 201*a*-201*b*, e.g., periodically sharing location information with each other via an exchange of wireless messages. Upon detecting this change in location of mobile tag 201*a*, one or both of the associated mobile tags 201*a*-201*b* may be configured to initiate a timer (e.g., one minute) to provide the individual carrying the operator mobile tag 201*a* time to return to the inner bounds of the perimeter 810. Upon initiating the timer, the operator mobile tag 201*a* may be configured to provide a visual, audible and/or tactile indication (e.g., a flashing LED of a certain color, e.g., amber; synthesized voice warning to user, and/or vibration of the operator mobile tag 201*a*) that notifies the individual that s/he has moved away from the vehicle associated with the first equipment mobile tag 201*b*, beyond a desirable and/or otherwise permissible area of operation (i.e., the perimeter 810). The first equipment mobile tag 201*b* associated with the vehicle may also be configured to provide a similar visual and/or audible alert.

If the timer expires before the individual with the operator mobile tag 201*a* returns within the perimeter 810, the formerly associated mobile tags 201*a*-201*b* may be configured at step 718 to detect this state and disassociate from each other at step 720. The disassociation may be communicated, e.g., visually, to other individuals in the demarcated area 200 based on the mobile tags 201a-201b, by changing their respective LEDs from a continuous dark green color to another LED state, e.g., an "off state" with no illumination. Upon initiating a disassociation at step 720, the one or both of the formerly associated mobile tags 201a-201b may be further configured to notify the server of this disassociation, e.g., via a wireless access terminal, such as a gateway anchor 208. In at least some embodiments, if the individual is aware that the operator mobile tag 201a has a one-minute timer, and the individual needs more time, the operator mobile tag 201a may be configured to detect an extension request via user-generated input detected by the user interface 904 of the mobile tag 201a (e.g., certain button depression technique, e.g., three rapid depressions of a button; speech command detected with speech recognition, etc.). Upon detecting the request, the operator mobile tag 201a may be configured to communicate this request wirelessly to the first equipment mobile tag 201b if it is within the coverage area of the first equipment mobile tag 201b, and/or via another wireless access terminal, such as a gateway anchor 208. To avoid misuse of an extension request, the mobile tags 201a-201b may be configured to allow no more than a certain number of extension requests (e.g., a limit of three extension requests).

It will be appreciated that the process 700 may be adapted to accommodate other embodiments contemplated by the subject disclosure. For example, the order in which mobile tags 201 perform the process 700 may be reversed in any order in whole or in part between the mobile tags performing steps 702-720.

While for purposes of simplicity of explanation, the respective processes are shown and described as a series of blocks in FIG. 20, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein. For example, referring back to step 706, if only a single pair of mobile tags 201 can be associated with each other, step 708 may not be necessary since a user of the mobile tag 201 will have a single choice.

Figure 22:
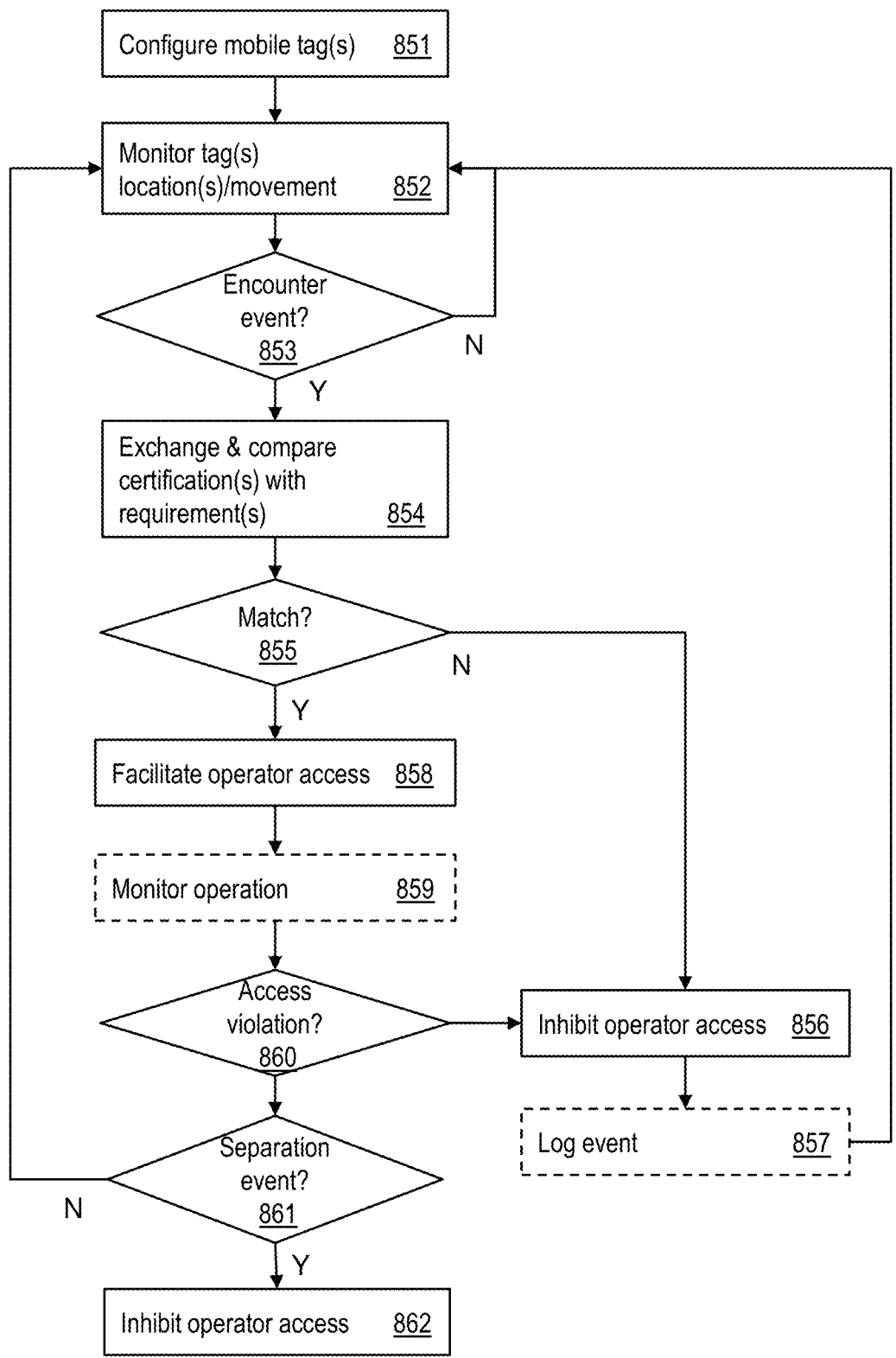
FIG. 22 depicts an illustrative embodiment of a process for using wireless tags to manage equipment-operator interactions in accordance with various aspects described herein.

FIG. 22 depicts an illustrative embodiment of a process 850 for using wireless tags to manage equipment-operator interactions in accordance with various aspects described herein. According to the example process 850, one or more mobile tags are configured at 851. Without limitation, the one or more tags may be configured according to a role in which the mobile tags participate in a role-dependent association. In an illustrative embodiment, a role-dependent association may include a tag-to-tag association according to an operator-equipment association. Other associations may include, without limitation, a vehicle-to-driver association, a vehicle-to-passenger association, a vehicle-to-parking space association, a vehicle-to-trailer association, a tool-to-equipment association, a person-to-person association, a person-to-asset association, a guest-to-guide association, a vehicle-to-roadway association, a product-to-packaging association, and so on. According to the example operator-equipment association, at least one of the mobile tags may be configured as an operator object, while at least another one of the mobile tags may be configured as an equipment object.

It is envisioned that in at least some embodiments, one or more of the mobile tags may be configured during a tag configuration process, e.g., in which an identity and/or role of the mobile tag may be established. In at least some embodiments, configuration information identifying the mobile tag's role, may be retained by the mobile tag, e.g., stored in an electronic storage device and/or register of the mobile tag. Alternatively or in addition, the configuration information may be retained externally to mobile tag, e.g., by a mobile tag configuration server. The configuration information may be requested from the mobile server and/or recalled by the mobile tag, e.g., in anticipation of and/or preparation for an association event. Alternatively or in addition, the mobile tag may initiate a transfer of a least a portion of a mobile tag's configuration information to another entity. Such other entities may include, without limitation, an anchor, another mobile tag, and/or an association server adapted to facilitation an association of the configured mobile tag according to its configured role.

Configuration of a mobile tag may occur during an initial tag configuration process, e.g., during fabrication of the mobile tag. Alternatively or in addition, configuration of the mobile tag may occur during deployment of the mobile tag, e.g., upon association of the mobile tag with an equipment item, attachment of the mobile tag to the equipment item and/or incorporation of the mobile tag within the equipment item. In at least some embodiments, configuration of the mobile tag may occur responsive to an association event and/or responsive to an association request, e.g., initiated by another entity, such as another mobile tag.

In at least some embodiments, the configuration of the mobile tag is fixed, i.e., unchangeable. Alternatively or in addition, configuration of the mobile tag may be adaptable and/or changeable. For example, the mobile tag may be configured as an equipment tag in general, and/or as an equipment tag associated with a particular type of equipment item, e.g., any forklift, any car, any truck and/or as a particular equipment item, e.g., as a particular forklift, as a particular car and/or as a particular truck. It is envisioned that configuration information may include one and or more than one configurable information items, e.g., fields of a configuration string. At least a portion of the configurable information may be fixed, while another portion of the configurable information may be changeable. For example, a mobile tag configured as an equipment tag may necessarily remain configured as an equipment tag by having its configuration information identifying it as an equipment tag fixed and/or otherwise unchangeable. Configuration information identifying a category and/or type of equipment may be fixed or variable. For example, when the configured equipment category corresponds to a vehicle, the mobile tag, i.e., a vehicle tag, may necessarily retain a fixed configuration as a vehicle, while other configurable details, such as a type of vehicle and/or particular vehicle may be reconfigurable.

It is envisioned that in at least some embodiments, a configuration of a mobile tag may occur responsive to a remotely issued configuration command. For example, a configuration command issued by a tag configuration server and directed toward a particular mobile tag and/or group of mobile tags. The configuration server may identify a particular mobile tag and/or group of tags according to one or more of a mobile tag identification number and/or name, a mobile tag network address, a mobile tag MAC address, and the like.

In at least some embodiments, a configuration of a mobile tag may include a role of the mobile tag in a tag association process. Alternatively or in addition, configuration of the mobile tag may include other information besides the role of the tag. Examples of other information may include, without limitation, a tag owner, a tag rank, e.g., according to a hierarchy of mobile tags, and/or a hierarch of configurable details, a tag validity period, e.g., an initialization and/or expiration date and/or time and/or duration. In some embodiments, only one configurable item of multiple number of configurable items of a mobile tag are configured at a time. For example a mobile tag's role, an associated object identifier, an association requirement, and the like, may be independently configured. An imposed configuration requirement may require a particular order and/or sequence of configuration. Alternatively or in addition, more than one of the configurable items may be configured at the same time.

According to the example operator-equipment association scenario, one mobile tag may be configured as an operation tag, while another mobile tag may be configured as an equipment tag. An association between an operator tag and an equipment tag may be subject to one or more portions of configured information. For example, a mobile tag configured as an operator tag may be configurable further to include an operator identity, e.g., a name an employee number, a license number, and so on. In at least some embodiments, an operator tag may be configured further to identify one or more operator qualifications and/or certifications. Qualifications and/or certifications may include, without limitation, successful completion of a training course, completion of a qualifying number of hours of operation of a particular equipment item and/or class of equipment, a record identifying an acceptable number of variances and so on.

In at least some embodiments, a mobile tag is configured as an operator object. The operator object may be associated with a particular individual, such that additional configuration information may include details obtained for the particular individual. Example details may include, without limitation, certification(s), e.g., based on operator identity, operator qualification(s).

In at least some embodiments, a mobile tag receives at least a portion of its configuration information wirelessly and stores and/or otherwise retains the configuration information according to a configured state of the mobile tag. For example, the mobile tag may receive at least a portion of its configuration information via a wideband signal. The wideband signal may be received from a location reference device, such as the example anchors described herein. Alternatively or in addition, the wideband signal may be received via one or more of a wireless access point, a mobile cellular radio, and so on.

At least some mobile tags may be configured and/or otherwise characterized as equipment tags. Equipment tags may be configured as an object having an equipment role, e.g., according to an operator-equipment association in which an operator object is adapted to operate, control and/or otherwise manipulate an equipment object. In at least some embodiments, the equipment object may be further configured according to one or more configuration parameters. For example, an equipment tag may be configured with a distance and/or other proximity value, e.g., proximity threshold within which an operator-equipment association may be initiated. Alternatively or in addition, the other configuration parameters may include an operator requirement, such as one or more of an operator certification requirement, an operator identity and/or class requirement, an operator's operation record requirement, e.g., as a measure of an operator's proficiency, duration of operation, time period since last operation, errors, or faults, and so on. Still other operator requirements may include one or more of a time-of-day restriction, a shift restriction, a location of operation restriction, and the like. The operator requirements may be considered individually and/or in combination, e.g., a shift depending upon an operator identity, or an operation duration depending upon an operator's proficiency.

According to the illustrative process 850, one or more mobile tags is monitored at 852 to obtain monitored information. Monitored information may include, without limitation, physical information, such as a location of the mobile tag, its orientation, speed, acceleration, weight, color, configured state, and/or any combination thereof. Alternatively or in addition, monitored information may include a power value, e.g., remaining power, a processor utilization, a storage value, e.g., used and/or remaining storage space of a storage device, and the like.

In at least some embodiments, the monitored information may be obtained and/or otherwise provided to the mobile tag associated with the physical property. Alternatively or in addition, at least a portion of the monitored information may be obtained by and/or otherwise provided to an entity other than the mobile tag. Such other entities may include, without limitation, a mobile tag tracking server, an anchor device, and/or another mobile tag, e.g., another mobile tag that may participate in a tag-to-tag association according to the monitored information.

By way of example, a mobile tag may generate monitored information based on a location of itself and/or an object with which the tag is associated. The location may be obtained as an absolute location, e.g., according to a common coordinate system, e.g., x-y and/or x-y-z coordinates. Alternatively or in addition, the location may be obtained as a reference location, e.g., in reference to another entity, such as a reference anchor and/or another tag. The tag's location may be determined according to any suitable technique, including the illustrative techniques disclosed herein. Other physical properties, such as speed, direction, acceleration, and so on may be determined directly and/or derived form other physical properties, such as position versus time.

According to the illustrative process 850, an event based upon one or more of the monitored physical properties may be identified at 853. For example, the event may be an encounter event in which the mobile tag encounters another entity, e.g., another mobile tag, based on one or more of a distance between the mobile tag and the other entity, and/or a rate of closure between the mobile tag and the other entity. The distance threshold may represent a maximum association distance that determines a possibility of a mobile tag association, e.g., an operator-equipment association, a vehicle-driver association, and the like. The example encounter event may be declared when a separation is less than a distance threshold value. For example, a position of an operator mobile tag may be monitored as an operator movies within a field that includes equipment mobile tags. Positions between the operator mobile tag and one or more equipment mobile tags may be determined at various times. Calculations of the distances may be obtained periodically, e.g., every fraction of a second, every second or every few seconds. Calculations of distance may be obtained relative to a speed, e.g., using shorter measurement intervals for faster moving tags.

To the extent an encounter event is not detected at 853, the process may continue monitoring a location and/or movement of one or more of the mobile tags at 852. To the extent an encounter event is detected at 853, the process 850 proceeds to exchange and/or compare one or more of the configured tag parameters of one tag, with one or more of other configured tag parameters of another tag. Such exchanges may be subject to tag properties, e.g., including tag configuration parameters. For example, exchanges may occur responsive to encounters between a first mobile tag configured according to an operator role and a second mobile tag configured according to an equipment role. Should the encounter have occurred between tags of the same type, e.g., operator-operator and/or equipment-equipment, the exchange of information may be inhibited. However, should the encounter occur between mobile tags having roles according to a target class of associations, e.g., operator-equipment associations, the exchange of information may be permitted at 854.

It is envisioned that the exchange of information may occur between the mobile tags responsible for the encounter event at 853. For example, an operator tag may forward one or more tag parameters, e.g., configuration parameters, to an encountered equipment tag. Consider an operator tag forwarding one or more of an operator identity and/or operator certification to the equipment tag. Alternatively or in addition, the equipment tag may forward one or more tag parameters, e.g., configuration parameters to an encountered operator tag. Consider an equipment tag forwarding one or more of an equipment type and/or identity, and/or operator requirement. Alternatively or in addition, one or more of the operator tag and the equipment tag may forward one or more tag parameters, e.g., configuration parameters to another device, such as an anchor and/or a back-end server.

A mobile tag that receives exchanged information may compare the received information to information of the recipient mobile tag. For example, an equipment tag receiving information from an operator tag may compare the received operator information, e.g., operator identity and/or operator certifications and/or operator qualifications, to identity, certification and/or qualification requirements of the recipient equipment tag. Alternatively or in addition, an operator tag receiving information from an equipment tag may compare the received equipment information, e.g., identity, certification and/or qualification requirements of the equipment to operator identity and/or operator certifications and/or operator qualifications, of the recipient operator tag. In at least some embodiments, a backend server may receive operator information from an operator tag and equipment information from an equipment tag.

The exchanged information may be compared to determine if there is a sufficient match at 855. For example, operator identity and/or certifications and/or qualifications may be compared to equipment requirements for operator identity, and/or certifications and/or qualifications to determine if there is a suitable match therebetween. To the extent a sufficient match is not determined at 855, the example process 850 may inhibit operator access at 856. In at least some embodiments, the results of the match and/or inhibition of the operator access may be logged, recorded and/or otherwise noted at 857 (shown in phantom). The example process 850 may proceed to continue from step 852, e.g., monitoring tag locations and/or movements at 852. In at least some embodiments, the monitoring of the tags at 852 and/or the encounter event at 853 may be altered to exclude monitoring and/or evaluation for encounters for one or more tags associated with a failed match as may be determined at 853.

To the extent a sufficient match is determined at 855, the example process 850 may facilitate operator access at 858. For example, physical access to the equipment may be granted to the operator only after a match has been determined at 855. Physical access may include unlocking one or more features of the equipment, such as a door of a vehicle, an ignition of a vehicle, an operator control of a piece of machinery, a safety interlock or switch of a tool, and the like.

Alternatively or in addition, operability of an operable feature of the equipment may be granted to an operator responsive to the match having determined that the operator is properly identified, certified and/or qualified to operate the equipment. Operable features may include operable controls of the equipment, e.g., access to a user interface, a display screen, and the like.

In at least some embodiments, one or more aspects of operation of the equipment may be monitored and/or recorded at 859 (shown in phantom). For example, a time value, e.g., a timer, may be initialized upon access having been granted at 858. An elapsed time may be monitored at 859. Alternatively or in addition, a condition of the equipment and/or a location and/or a speed and/or an orientation of the equipment may be monitored at 859. Alternatively or in addition, an operator parameter may be monitored at 859. Operator parameters may include, without limitation, an operator's fatigue, level of concentration, operating proficiency, and/or other physical parameter, e.g., pulse, heart rate, blood oxygen level, blood-alcohol level, and the like.

The example process 850 may determine at 860 whether an access and/or operation violation has occurred. Examples of an access and/or operation violation may include, without limitation, an occurrence of an equipment fault condition and/or a violation of an operable feature, e.g., a speed of a vehicle, and/or a location of a forklift. To the extent it is determined at 860 that an access and/or operation violation has occurred, the example process 850 may proceed to inhibit operation at 856, optionally logging the event at 857. However, to the extent it is determined at 860 that an access and/or operation violation has not occurred, the example process 850 may continue to determine at 861 if a separation event has occurred. In this regard, the example process 850 may monitor locations and/or orientations and/or movement of one or more of the associated tags, e.g., the operator tag and the equipment tag of an operator-equipment association. To the extent a separation event is not determined at 861, the example process 850 may continue monitoring locations and/or movement of the tags at 852. However, to the extent a separation event is determined at 861, the example process 850 may inhibit operator access at 862. In at least some embodiments a formerly determined operator-equipment association may be extinguished and/or otherwise disassociated responsive to determination of a separation event at 861.

In at least some embodiments, the equipment and/or operator tag may have a configuration parameter that identifies a separation threshold distance and/or orientation. In some embodiments, the separation threshold distance may be the same as the encounter threshold. Alternatively, the separation threshold distance may be different, e.g., being greater than the encounter threshold. This may provide an operator with some leeway in separation during a period of operation, while terminating an association when separation may have extended beyond a safe operation limit, e.g., beyond arm's length, beyond visual range, and the like.

While for purposes of simplicity of explanation, the respective processes are shown and described as a series of blocks in FIG. 22, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein. For example, referring back to steps 860 and/or 861, the process

850 may facilitate tag-to-tag associations without necessarily monitoring for access violations and/or separation events.

Figure 23:
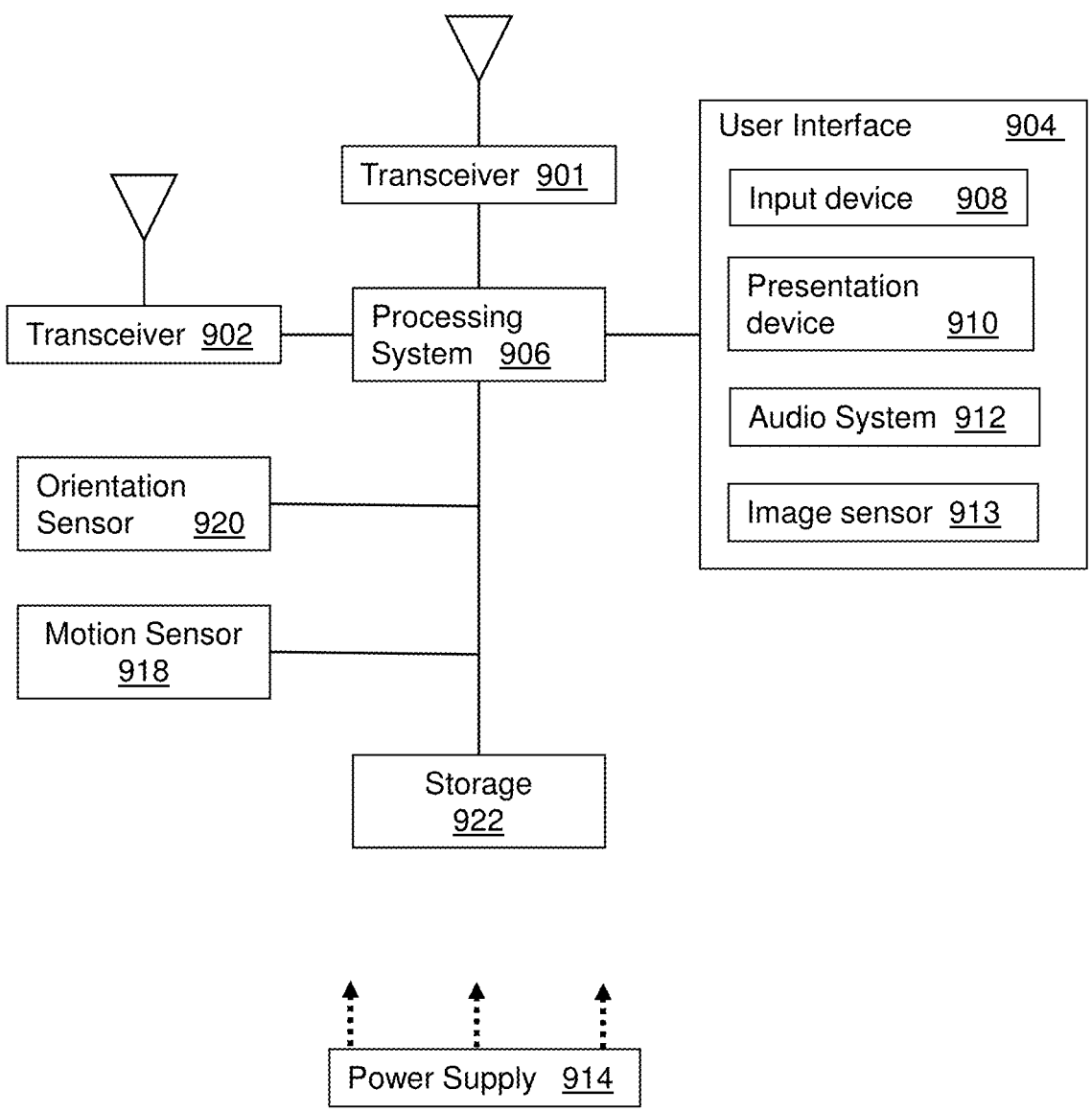
FIG. 23 is a block diagram of an example, non-limiting embodiments of a communication device in accordance with various aspects described herein.

FIG. 23 is a block diagram of an example, non-limiting embodiments of a communication device 900 in accordance with various aspects described herein. The communication device 900 may serve in whole or in part as an illustrative embodiment of a mobile tag 101, 201, 651, 652 and/or an anchor or reference station 102, 104, 106, 108, 204, 653 as depicted in FIGS. 1-7, 18, and 21A-21C may be configured to perform in whole or in part portions of processes 300, 600, 700 and 850 of FIGS. 8, 17, 20 and 22.

In an embodiment, communication device 900 may comprise one or more of a first wireless transceivers 901, a user interface (UI) 904, a power supply 914, and/or a processing system 906, e.g., for managing operations of the communication device 900. In another embodiment, communication device 900 may further include one or more of a second wireless transceiver 902, a motion sensor 918, and/or an orientation sensor 920. The first wireless transceiver 901 may be configured to support wideband wireless signals such as ultra-wideband signals (e.g., 500 MHz or greater) for performing precision measurements such as TDOA and/or TW-TOA as described above and may be further configured for exchanging messages (e.g., x-y coordinates, location flags, etc.).

The second wireless transceiver 902 may be configured to support narrowband wireless signals, including wireless access technologies such as Bluetooth®, ZigBee®, or WiFi (Bluetooth® and ZigBee® are trademarks registered by the Bluetooth® Special Interest Group and the ZigBee® Alliance, respectively). In at least some embodiments, the second wireless transceiver 902 may be utilized to conserve power and offload messaging between communication devices by utilizing narrow band signals such as Bluetooth®, ZigBee®, or WiFi, instead of ultra-wideband signals. One or both wireless transceivers 901, 902 may also be used for obtaining a strength indicator (RSSI). One or both wireless transceivers 901, 902 may also be equipped with multiple antennas and one or more phase detectors to determine angle of arrival of wireless signals and thereby an orientation of the communication device 900 (e.g., mobile tag 101) relative to another communication device 900 (e.g., anchor 204).

The UI 904 may include an input device 908 that provides at least one of one or more depressible buttons, a tactile keypad, a touch-sensitive keypad, a touchscreen and/or a pointing or navigation mechanism such as a roller ball, a joystick, or a navigation disk for manipulating operations of the communication device 900. The input device 908 may be an integral part of a housing assembly of the communication device 900 or an independent device operably coupled thereto by a tethered wireline interface (such as a USB cable) or a wireless interface supporting for example Bluetooth®. The UI 904 may further include a presentation device 910. The presentation device 910 may include a vibrator to generate haptic feedback, an LED (Light Emitting Diode) configurable by the processing system 906 to emit one or more colors, and/or a monochrome or color LCD (Liquid Crystal Display) or OLED (Organic LED) display configurable by the processing system to present alphanumeric characters, icons, or other displayable objects.

The UI 904 may also include an audio system 912 that utilizes audio technology for conveying low volume audio (for proximity listening by a user) and/or high-volume audio (for hands free operation). The audio system 912 may further include a microphone for receiving audible signals of an end user. The audio system 912 may also be used for voice recognition applications. The UI 904 may further include an image sensor 913 such as a charged coupled device (CCD) camera for capturing still or moving images in a vicinity of the communication device 900. The camera may be used for performing facial recognition and user ID recognition that may be combined with embodiments of the subject disclosure.

The power supply 914 may utilize common power management technologies such as replaceable and rechargeable batteries, supply regulation technologies, and/or charging system technologies for supplying energy to the components of the communication device 900 to facilitate portable applications. Alternatively, or in combination, the charging system may utilize external power sources such as DC power supplied over a physical interface such as a USB port or other suitable tethering technologies.

The motion sensor 918 may utilize motion sensing technology such as an accelerometer, a gyroscope, or other suitable motion sensing technology to detect motion of the communication device 900 in three-dimensional space. The orientation sensor 920 may utilize orientation sensing technology such as a magnetometer to detect the orientation of the communication device 900 (in degrees, minutes, or other suitable orientation metrics). In some embodiments, the orientation sensor 920 may replace a need for utilizing multiple antennas with the first and/or second wireless transceivers 901, 902 and a phase detector for performing angle of arrival measurements. In other embodiments, the function of the orientation sensor 920 may be combined with an angle of arrival measurement performed with multiple antennas with the first and/or second wireless transceivers 901, 902 and a phase detector.

The processing system 906 may utilize computing technologies such as a microprocessor, a digital signal processor (DSP), programmable gate arrays, application specific integrated circuits (ASICs), and/or a video processor with associated storage memory such as Flash, ROM, RAM, SRAM, DRAM, or other storage technologies for executing computer instructions, controlling, and processing data supplied by the aforementioned components of the communication device 900.

In at least some embodiments, the storage device 922 may be adapted to store instructions executable by the processing system 906. Alternatively or in addition, the storage device 922 may be adapted to store information related to operation of the mobile tag, such as a tag identity, e.g., as an operator and/or equipment.

Other components not shown in FIG. 23 may be used in one or more embodiments of the subject disclosure. For instance, the communication device 900 may include a reset button (not shown). The reset button may be used to reset the controller 906 of the communication device 900. In yet another embodiment, the communication device 900 may also include a factory default setting button positioned, for example, below a small hole in a housing assembly of the communication device 900 to force the communication device 900 to re-establish factory settings.

The communication device 900 as described herein may operate with more or less of the circuit components shown in FIG. 23. These variant embodiments may be used in one or more embodiments of the subject disclosure.

Figure 24:
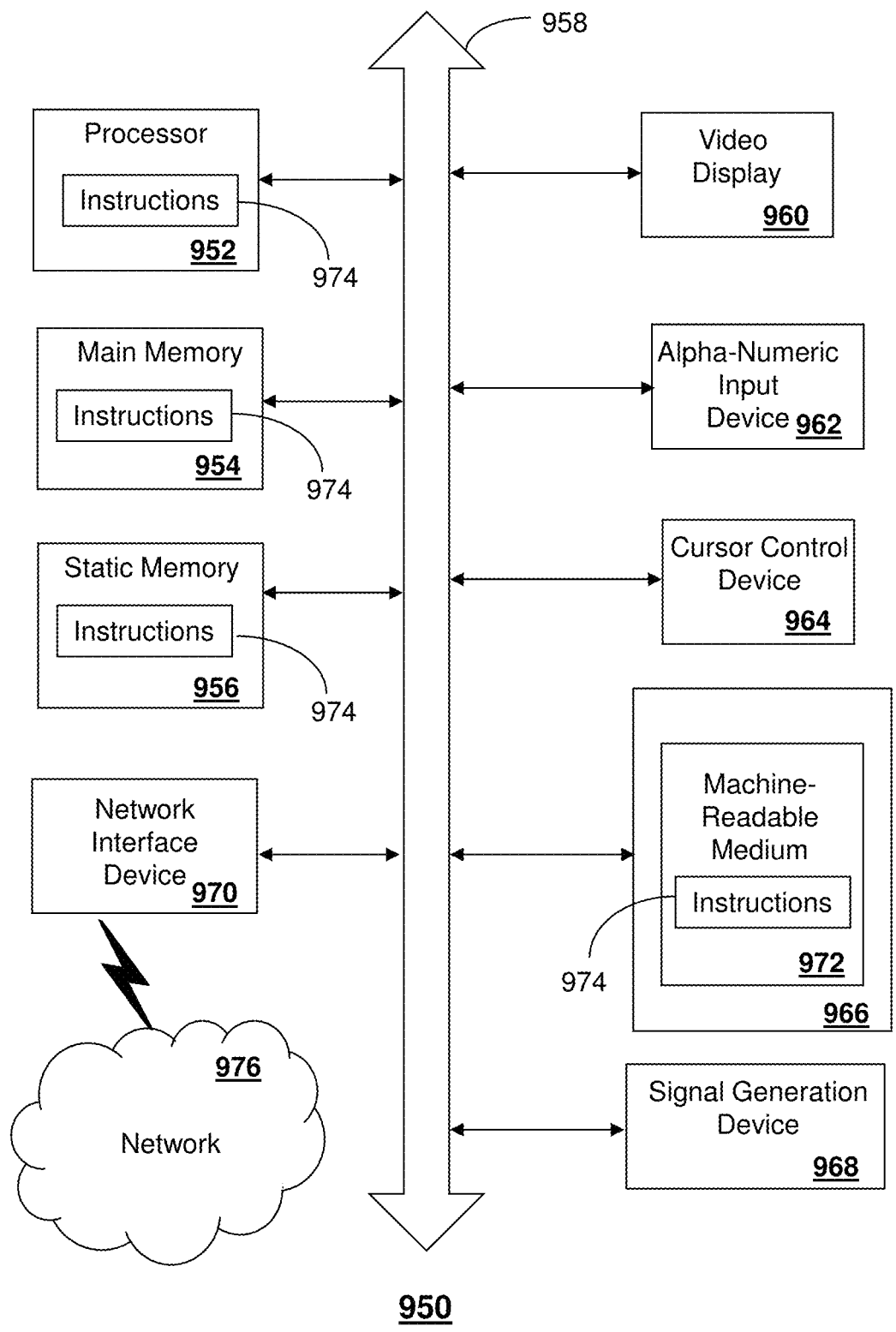
FIG. 24 is a block diagram of an example, non-limiting embodiments of a computing system in accordance with various aspects described herein.

FIG. 24 depicts an example diagrammatic representation of a machine in the form of a computing system 950 within which a set of instructions, when executed, may cause the machine to perform any one or more of the methods described above. One or more instances of the machine may operate, for example, as the computing system referred to in the processes 300, 600, 700 and 850 of FIGS. 8, 17, 20 and 22. In some embodiments, the machine may be connected (e.g., using a network 976) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides data communication. Further, while a single machine is illustrated, the term "machine" shall also be taken to include any collection of machines (physical or virtual machines) that individually or jointly execute a set (or multiple sets) of instructions to perform any one or more of the methods discussed herein.

The computer system 950 may include a processor (or controller) 952 (e.g., a central processing unit (CPU)), a graphics processing unit (GPU, or both), a main memory 954 and a static memory 956, which communicate with each other via a bus 958. The computer system 950 may further include a display unit 960 (e.g., a liquid crystal display (LCD), a flat panel, or a solid-state display). The computer system 950 may include an input device 962 (e.g., a keyboard), a cursor control device 964 (e.g., a mouse), a disk drive unit 966, a signal generation device 968 (e.g., a speaker or remote control) and a network interface device 970. In distributed environments, the embodiments described in the subject disclosure may be adapted to utilize multiple display units 960 controlled by two or more computer systems 950. In this configuration, presentations described by the subject disclosure may in part be shown in a first of the display units 960, while the remaining portion is presented in a second of the display units 960.

The disk drive unit 966 may include a tangible computer-readable storage medium 972 on which is stored one or more sets of instructions (e.g., software 974) embodying any one or more of the methods or functions described herein, including those methods illustrated above. The instructions 974 may also reside, completely or at least partially, within the main memory 954, the static memory 956, and/or within the processor 952 during execution thereof by the computer system 950. The main memory 954 and the processor 952 also may constitute tangible computer-readable storage media.

One or more aspects of the subject disclosure include a first mobile tag, comprising a processing system including a processor, and a memory that stores executable instructions that, when executed by the processing system, facilitate performance of operations. The operations can include determining first location information of the first mobile tag according to a location determination process initiated with at least one anchor, wirelessly receiving second location information from a second mobile tag, detecting an association event between the first mobile tag and the second mobile tag based on a comparison of the first location information and the second location information, initiating an indication at the first mobile tag representing the association event, and determining whether to associate the first mobile tag and the second mobile tag based on an association determination process initiated between the first mobile tag and the second mobile tag.

One or more aspects of the subject disclosure include a method for determining, by a processing system of a first mobile tag, a location of the first mobile tag via communications with at least one anchor, receiving, by the processing system, a plurality of locations from a plurality of mobile tags, detecting, by the processing system, an association event between the first mobile tag and the plurality of mobile tags based on a comparison of the location of the first mobile tag and the plurality of locations of the plurality of mobile tags, and responsive to the detecting the association event, determining whether to associate the first mobile tag with a second mobile tag identified from the plurality of mobile tags based on an association determination process initiated between the first mobile tag and the plurality of mobile tags.

One or more aspects of the subject disclosure include a machine-readable medium comprising executable instructions that, when executed by a processing system including a processor, facilitate performance of operations. The machine-readable medium and the processing system can be operated from a first mobile tag, and the operations of the processing system can include obtaining a location of a first mobile tag, responsive to detecting a second mobile tag crossing a threshold relative to the location of the first mobile tag, determining according to an activity associated with the first mobile tag, the second mobile tag, or both whether there is an association event between the first mobile tag and the second mobile tag, and responsive to determining the activity corresponds to the association event, determining whether to associate the first mobile tag and the second mobile tag.

One or more aspects of the subject disclosure include a device that utilizes a processing system including a processor and a memory that stores executable instructions that, when executed by the processing system, facilitate performance of operations. The operations may include monitoring a beacon signal generated by at least one anchor of a plurality of anchors located in a network, the network enabling the device and a plurality of other devices to determine their respective locations in a coverage area of the network, detecting a plurality of instances in which the beacon signal generated by the at least one anchor of the plurality of anchors is not sensed by the device, and responsive to the plurality of instances exceeding a first threshold, transitioning to peer-to-peer communications between the device and one or more devices of the plurality of other devices, wherein the peer-to-peer communications enables the device to determine its location relative to the one or more devices.

One or more aspects of the subject disclosure include a machine-readable medium comprising executable instructions that, when executed by a processing system including a processor, facilitate performance of operations. The operations may include performing peer-to-peer communication services to determine a location of the device relative to other devices, monitoring for a presence of a beacon signal during a finite period having a select periodicity, the beacon signal generated by at least one anchor of a plurality of anchors located in a network, the network enabling the device and a plurality of other devices to determine their respective locations when located in a coverage area of the network, detecting the presence of the beacon signal generated by the at least one anchor of the network, extending the finite period to synchronize a clock of the device to the beacon signal generated by the at least one anchor of the network, and responsive to the device being synchronized to beacon signal, determining whether to transition from peer-to-peer communications to communications with the at least one anchor of the plurality of anchors located in the network.

One or more aspects of the subject disclosure include a method for monitoring, by a processing system including a processor operating from a device, a synchronization signal generated by at least one anchor of a plurality of anchors located in a network, the network enabling the device and a plurality of other devices to determine their respective locations in a coverage area of the network; detecting, by the processing system, an inability to sense the synchronization signal generated by the at least one anchor of the plurality of anchors for a number of frames, each frame including an instance of the synchronization signal; and responsive to the detecting, configuring, by the processing system, the device to transition to peer-to-peer communications between the device and one or more devices of the plurality of other devices, wherein the peer-to-peer communications enables the device to determine its location relative to the one or more devices.

Dedicated hardware implementations including, but not limited to, application specific integrated circuits, programmable logic arrays and other hardware devices may likewise be constructed to implement the methods described herein. Application specific integrated circuits and programmable logic array may use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing may also be constructed to implement the methods described herein. Distributed processing environments may include multiple processors in a single machine, single processors in multiple machines, and/or multiple processors in multiple machines. It is further noted that a computing device such as a processor, a controller, a state machine, or other suitable device for executing instructions to perform operations or methods may perform such operations directly or indirectly by way of one or more intermediate devices directed by the computing device.

While the tangible computer-readable storage medium 722 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices, and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which may be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. In one or more embodiments, information regarding use of services may be generated including services being accessed, media consumption history, user preferences, and so forth. This information may be obtained by various methods including user input, detecting types of communications (e.g., video content vs. audio content), analysis of content streams, and so forth. The generating, obtaining and/or monitoring of this information may be responsive to an authorization provided by the user. In one or more embodiments, an analysis of data may be subject to authorization from user(s) associated with the data, such as an opt-in, an opt-out, acknowledgement requirements, notifications, selective authorization based on types of data, and so forth.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The example embodiments may include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, may be used in the subject disclosure. For instance, one or more features from one or more embodiments may be combined with one or more features of one or more other embodiments. In one or more embodiments, features that are positively recited may also be negatively recited and excluded from the embodiment with or without replacement by another structural and/or functional feature. The steps or functions described with respect to the embodiments of the subject disclosure may be performed in any order. The steps or functions described with respect to the embodiments of the subject disclosure may be performed alone or in combination with other steps or functions of the subject disclosure, as well as from other embodiments or from other steps that have not been described in the subject disclosure. Further, more than or less than all of the features described with respect to an embodiment may also be utilized.

Less than all of the steps or functions described with respect to the example processes or methods may also be performed in one or more of the example embodiments. Further, the use of numerical terms to describe a device, component, step, or function, such as first, second, third, and so forth, is not intended to describe an order or function unless expressly stated so. The use of the terms first, second, third and so forth, is generally to distinguish between devices, components, steps, or functions unless expressly stated otherwise. Additionally, one or more devices or components described with respect to the example embodiments may facilitate one or more functions, where the facilitating (e.g., facilitating access or facilitating establishing a connection) may include less than every step needed to perform the function or may include all of the steps needed to perform the function.

The Abstract of the Disclosure is provided with the understanding that it will not be used to interpret or limit the scope or meaning of the claims. In addition, in the foregoing Detailed Description, it may be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method, comprising:
   storing, by a processing system comprising a processor, a qualification value of an operator in a first mobile tag transportable by the operator, wherein the qualification value comprises successful completion of a training course for a type of equipment and hours of operation of the type of equipment;
   receiving, by the processing system and via a first wireless technology, a first wireless signal originating from a reference terminal located at a predetermined reference terminal location;
   determining, by the processing system, a position of the first mobile tag according to the first wireless signal and the predetermined reference terminal location, wherein the position indicates a location of the operator;
   calculating, by the processing system, a separation between the first mobile tag and a second mobile tag attached to equipment having the type of equipment associated with the qualification value, wherein the second mobile tag is configured with an equipment qualification requirement required to operate the equipment; and
   responsive to the separation being less than a threshold distance, sending a message causing the first mobile tag to forward the qualification value of the operator to the second mobile tag via a peer-to-peer wireless technology, wherein the second mobile tag generates and transmits an operator-equipment association responsive to a match between the qualification value of the operator and the equipment qualification requirement; and
   verifying, by the processing system, the operator-equipment association, wherein the operator-equipment association facilitates operator access to an operable feature of the equipment responsive to the verifying.

2. The method of claim 1, further comprising receiving the qualification value from a remote, network accessible certification server.

3. The method of claim 2, wherein the qualification value is received via the first wireless signal.

4. The method of claim 1, wherein the first wireless technology comprises a wideband signaling technology, and wherein the peer-to-peer wireless technology comprises narrowband signaling technology.

5. The method of claim 1, wherein the equipment comprises a vehicle, and wherein the operator-equipment association facilitates unlocking a door of the vehicle.

6. The method of claim 1, wherein the equipment comprises machinery, and wherein operation of the machinery is inhibited without the operator-equipment association.

7. The method of claim 1, further comprising:
   monitoring, by the processing system and subsequent to generation of the operator-equipment association, an aspect of operation of the equipment by the operator to obtain a monitored aspect of operation; and
   terminating, by the processing system, the operator-equipment association responsive to the monitored aspect of operation.

8. The method of claim 7, wherein the terminating further comprises terminating, by the processing system, the operator-equipment association responsive to the monitored aspect of operation exceeding a threshold.

9. The method of claim 8, wherein the monitored aspect of operation comprises a duration of time.

10. The method of claim 7, further comprising updating, by the processing system, the qualification value to obtain an updated qualification value, wherein the updating is based on the monitored aspect of operation.

11. The method of claim 1, further comprising:
    determining, by the processing system, an identity of a holder of the first mobile tag; and
    verifying, by the processing system, that the holder of the first mobile tag corresponds to the operator.

12. The method of claim 11, wherein the determining the identity of the holder of the first mobile tag is based on biometric data obtained from the holder of the first mobile tag.

13. The method of claim 1, wherein the position comprises a height value corresponding to one of a height of the first mobile tag, a height of the second mobile tag, a relative height between the first mobile tag and the second mobile tag, or any combination thereof.

14. A device, comprising:

a processing system including a processor; and a memory that stores executable instructions that, when executed by the processing system, facilitate performance of operations, the operations comprising:

storing, within a first mobile device, a qualification value of an operator comprising an indication of successful completion of a training course for a type of equipment and hours of operation of the type of equipment, wherein the first mobile device is transportable by the operator;

obtaining, via a first wireless technology, a first wireless signal from a reference terminal at a known location;

determining a position of the first mobile device according to the first wireless signal and the known location, the position indicative of a location of the operator;

determining a proximate relationship between the first mobile device and a tag device attached to equipment, wherein the tag device is configured with an equipment qualification requirement; and responsive to the proximate relationship satisfying a threshold value, providing the qualification value of the operator to the tag device via a peer-to-peer wireless technology, wherein the tag device generates and sends an operator-equipment association responsive to a match between the type of equipment in the qualification value and a type of the equipment having the tag device attached, and the equipment qualification requirement and the qualification value of the operator, wherein the operator-equipment association facilitates operator access to an operable feature of the equipment.

15. The device of claim 14, wherein the proximate relationship comprises an orientation of one of the first mobile device, the tag device attached to the equipment, or a combination thereof.

16. The device of claim 14, wherein the first wireless signal comprises a wideband signaling technology, and wherein the peer-to-peer wireless technology comprises narrowband signaling technology.

17. A non-transitory, machine-readable medium comprising executable instructions that, when executed by a processing system including a processor operating from a device, facilitate performance of operations, the operations comprising:

storing, at a first mobile device, a qualification value of an operator, wherein the first mobile device is transportable by the operator, wherein the qualification value comprises hours of operation of an equipment type;

obtaining, via a first wireless technology, a first wireless signal from a reference terminal at a fixed location;

determining a position of the first mobile device according to the first wireless signal and the fixed location, the position indicative of a location of the operator;

determining a physical relationship between the first mobile device and a tag device attached to equipment, wherein the tag device is configured with an equipment qualification requirement of hours of operation; and responsive to the physical relationship satisfying a threshold value, initiating a comparison of the qualification value of the operator and the equipment qualification requirement, wherein the tag device generates an operator-equipment association responsive to a match between the equipment type in the qualification value and the type of the equipment that the tag device is attached, and the qualification value of the operator exceeding the equipment qualification requirement, wherein the operator-equipment association facilitates operator access to an operable feature of the equipment.

18. The non-transitory, machine-readable medium of claim 17, wherein the physical relationship further comprises a separation between the first mobile device and the tag device, and wherein the threshold value further comprises a threshold distance from a location of the equipment.

19. The non-transitory, machine-readable medium of claim 17, wherein the initiating the comparison of the qualification value of the operator and the equipment qualification requirement further comprises exchanging one of the qualification value of the operator, the equipment qualification requirement or both via a peer-to-peer wireless signal.

20. The non-transitory, machine-readable medium of claim 19, wherein the first wireless signal comprises a wideband communication signal, and wherein the peer-to-peer wireless signal comprises narrowband communication signal.

* * * * *